(12) United States Patent
Jones et al.

(10) Patent No.: US 7,166,984 B1
(45) Date of Patent: Jan. 23, 2007

(54) SIGNALING AND REDUCED TORQUE RIPPLE IN BRUSHLESS REPULSION MOTORS

(75) Inventors: William Jones, Hunting Valley, OH (US); Robert G. Kilmo, North Royalton, OH (US); Douglas A. Toman, Medina, OH (US); Wyatt S. Newman, Cleveland, OH (US)

(73) Assignee: Dynamotors, Inc., Warrensville Heights, OH (US)

( * ) Notice: Subject to any disclaimer, the term of this patent is extended or adjusted under 35 U.S.C. 154(b) by 0 days.

(21) Appl. No.: 11/267,996

(22) Filed: Nov. 7, 2005

(51) Int. Cl.
*H02P 6/08* (2006.01)
*H02K 1/18* (2006.01)

(52) U.S. Cl. .................... 318/725; 318/439; 318/254; 310/254; 310/258

(58) Field of Classification Search .................... None
See application file for complete search history.

(56) References Cited

U.S. PATENT DOCUMENTS

| 5,103,225 | A | * | 4/1992 | Dolan et al. ............... 318/439 |
| 5,424,625 | A | | 6/1995 | Haner |
| 5,686,805 | A | | 11/1997 | Haner |
| 5,936,374 | A | * | 8/1999 | Haner ....................... 318/725 |
| 6,049,187 | A | | 4/2000 | Haner |
| 6,108,488 | A | | 8/2000 | Haner |
| 6,321,032 | B1 | * | 11/2001 | Jones et al. ................ 318/254 |
| 6,693,422 | B2 | * | 2/2004 | Lutz ......................... 318/254 |
| 6,737,784 | B2 | * | 5/2004 | Lindquist et al. .......... 310/216 |
| 7,053,586 | B2 | * | 5/2006 | Jones ........................ 318/725 |
| 2002/0063492 | A1 | * | 5/2002 | Scott ......................... 310/261 |

FOREIGN PATENT DOCUMENTS

| JP | 03003622 A | * | 1/1991 |
| JP | 11069668 A | * | 3/1999 |
| JP | 200341913 A | | 12/2000 |
| JP | 2000341913 A | * | 12/2000 |

* cited by examiner

*Primary Examiner*—Lincoln Donovan
*Assistant Examiner*—Eduardo Colon Santana
(74) *Attorney, Agent, or Firm*—Fay, Sharpe, Fagan, Minnich, and McKee, LLP

(57) ABSTRACT

Brushless repulsion motors are presented, in which rotor coils switching signal detectors are selectively located in spaced angular relationship on the rotor and signaling sources are distributed around all or most of the stator circumference to allow looser tolerances for motor manufacturing and improved controllability of rotor coil actuation during operation. Asymmetric stator poles are also provided for brushless repulsion motors to mitigate torque ripple and vibration, in which the shape of the stator pole tips is tailored by varying the angular length of the pole section.

23 Claims, 32 Drawing Sheets

SIGNALING AND REDUCED TORQUE RIPPLE IN BRUSHLESS REPULSION MOTORS

FIELD OF THE INVENTION

The present invention relates generally to electric motors and more particularly to improved brushless repulsion motors with improved rotor coil switch signaling and reduced torque ripple.

INCORPORATION BY REFERENCE

Brushless repulsion motors and related technology are shown in the following U.S. patents: Haner U.S. Pat. No. 5,424,625; Haner U.S. Pat. No. 6,049,187; Haner U.S. Pat. No. 6,108,488; and Jones U.S. Pat. No. 6,321,032, the entireties of which are hereby incorporated by reference as if fully set forth herein.

BACKGROUND OF THE INVENTION

Repulsion motors have torque speed performance curves and other performance characteristics similar to those of series DC motors and universal series motors, and also offer high starting torque with comparatively low starting current, and the ability to sustain the high starting torque for long periods of time. This type of motor is also adaptable to a wide range of controllable speeds, wherein the no load speed of the repulsion motor can be many times higher than the synchronous speed. Repulsion motors are typically constructed with a stator having field windings energized by single phase AC power to provide a magnetic field between a pair of stator poles. A DC rotor is provided with an armature winding connected to a commutator, wherein brushes were previously provided to ride on the commutator for shorting specific rotor winding coils as the rotor turns. Providing AC power to the stator field winding creates a stator field, causing current to be induced in the shorted coils of the armature to create a rotor field that interacts with the stator field to produce torque and rotation of the armature. This type of repulsion motor has not been widely adopted because the brushes and commutator wear out quickly due to arcing and heat generated by the brushes contacting the commutator. An alternative design is known as a repulsion start, induction-run motor, in which a squirrel cage rotor is provided in the wound repulsion motor rotor armature, together with mechanisms for lifting the brushes from the commutator when the rotor speed reaches a predetermined value, whereafter the motor runs as a normal induction motor. This hybrid type motor provides the high starting torque advantages of repulsion motors with the low maintenance advantages of induction motors.

A fundamental improvement in motor design and control has resulted from the introduction of brushless repulsion (BLR) motors, which provide the performance advantages of repulsion motors without the need for brushes. Examples of BLR motors are shown in Haner U.S. Pat. No. 5,424,625; Haner U.S. Pat. No. 6,049,187; Haner U.S. Pat. No. 6,108, 488; and Jones U.S. Pat. No. 6,321,032, which are incorporated by reference so that background information and structure of brushless repulsion motors need not be described in detail. In the brushless motors of Haner U.S. Pat. No. 5,424,625, the brush-based commutator circuits are replaced with rotor mounted electronic switches controlled by optical detectors or sensors for selectively shorting individual rotor coils in response to optical signals received from light emitting diode (LED) light sources positioned on the stator. The stator poles are energized to create a stator magnetic field, from which flux passes directly through the rotor and induces a voltage in each shorted rotor coil. When a rotor coil switch is closed, current flows through the coil to produce flux, torque, and rotation. However, when the switch is open, current cannot flow and no torque or rotation is produced by that coil. Closing the switch for a longer period produces more power and increases the speed. Thus, the motor's torque and speed can be adjusted as desired by controlling how long (over what rotational angle) the switches are open. The rotor coil switches are activated by an optical signal detector as the detector rotates past the stator-mounted LEDs, and the LEDs can be turned on for varying amounts of time to adjust the motor's speed and the torque produced by the motor.

In the BLR motors of Haner U.S. Pat. No. 5,424,625, the LEDs are positioned at predetermined locations within a small arcuate portion or sector of the stator circumference and are illuminated to activate rotor-mounted electronic circuits to short rotor coils when the coils are in a predetermined angular position relative to the stator poles. In particular, the stator field creates alternating positive and negative torque sectors or regions in which shorted rotor coils therein produce positive and negative torque, respectively. Thus, for rotation in a given direction, it is desirable to short the rotor coils when they are within the stator field torque sectors of the polarity corresponding to the desired rotational direction. The LEDs of conventional BLR motors are typically controlled in closed loop fashion according to a measured or sensed rotor position and a desired motor operating condition, such as speed, torque, etc. Moreover, in conventional BLR motors, the optical signal detectors are mounted in-line with the torque producing segments of the corresponding rotor coils (i.e., the angular location of each light detector is at the same angular center as the associated rotor coil segment), and the control LEDs are positioned at predefined angular locations on the stator that correspond to torque producing regions in the stator field. For instance, Haner U.S. Pat. No. 5,424,625 shows a two pole BLR motor with six rotor coils, where each rotor coil has two torque producing segments parallel to the rotor axis. In this two pole motor design, torque of a first rotational polarity (e.g., positive torque) is produced when a shorted rotor coil segment is within one of two diametrically opposite positive torque sectors of the stator field, where each of the two positive torque sectors occupies approximately 90 mechanical degrees extending from a soft neutral angle along a line extending between the stator pole centers and a hard neutral angle on a line between the centers of the gaps between the stator poles. Ninety degree wide negative torque sectors are located between the positive torque sectors, wherein one or more sets of diametrically opposed LEDs are placed on one side of a magnetic hard neutral location of the stator field, wherein several sets of such diametrically opposite LED pairs can be used in the Haner style BLR motors to control the angle at which rotor coils are shorted within a given positive or negative torque sector.

In BLR motors, as with other motor types, it is desirable to provide smooth rotor torque to drive a given load. The smoothness of motor torque is typically measured in terms of ripple torque, where the peak torque is often much greater than the average torque, with the torque value varying as a function of rotor angle. In this regard, the conventional two pole BLR motors may also suffer from significant torque ripple, where the peak torque occurs as a shorted rotor coil passes near a stator pole tip. Where multiple rotor coils are used, the torque peaks of individual coils are separated in time and combine to produce a ripple effect in the total produced torque, which can lead to vibration, noise, premature bearing wear, and other problems in BLR motors. One method of reducing this torque fluctuation is to provide a large number of stator poles. Thus, while Haner U.S. Pat. No. 5,424,625 illustrates a two pole BLR motor, it may be desirable to provide multiple stator pole pairs to achieve smoother torque than is possible in 2 pole BLR motors. In addition, a relatively large number of coil segments may be provided in the rotor of a BLR motor in order to achieve a given set of speed and torque performance parameters.

For precise control of rotor speed and/or torque, moreover, it is important to be able to selectively short one or more selected rotor coils at a given point in time without inadvertent shorting of other non-selected coils. However, as the number of stator poles and the number of torque-producing rotor coil segments are increased in conventional BLR motors, the spacing between the stator mounted LED signaling sources and the spacing between the rotor-mounted detectors decreases. This may lead to crosstalk situations in which non-selected rotor coils are shorted when the associated optical detector is proximate a lighted LED. Because the detector is aligned with the corresponding rotor coil in conventional BLR motors, the angular spacing between neighboring optical signal detectors on the rotor of Haner U.S. Pat. No. 5,424,625 and other prior BLR motors is equal to the spacing between rotor coil segments. Light dispersion effects in LEDs and other optical signaling devices become more pronounced as the motor dimensions are reduced and as the number of stator poles and rotor coil segments increase, thereby making the manufacture of BLR motors with consistent operational performance more difficult. One manufacturing difficulty is variation in LEDs, in which light provided by a given LED establishes a corresponding light distribution or pattern (cone), with distributions varying according to LED type, manufacturing production lot, vendor, orientation, current supply, age, temperature, and LED-to-detector distance. These production variations in LED signaling source patterns make it difficult to provide precise illumination spots such that the rotating detectors and corresponding switching circuitry of the rotor are activated at exactly the desired time and place without undesired activation of detectors associated with non-selected rotor coils. Such difficulties may be addressed by using more coherent light sources or fiber optic devices, but these solutions are costly. Accordingly, there is a need for improved brushless repulsion motors, by which rotor coil switching circuits can be actuated at precise angular positions and times in a cost effective manner, and torque ripple can be reduced in BLR motors, particularly for motors having multiple stator pole pairs and relatively large numbers of rotor coil segments.

SUMMARY OF THE INVENTION

A summary of one or more aspects of the invention is now presented to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter.

The present invention relates to brushless repulsion motors with rotor signal detectors spaced farther apart than in conventional BLR motors, and with stator mounted signaling devices angularly spaced around all or a substantial portion of the stator circumference. This feature may help to alleviate or avoid cross talk between illuminated LEDs or other stator-mounted signaling sources and signal detectors associated with non-selected rotor coils, thereby improving the ability to selectively control individual rotor coils in brushless repulsion motors without the additional cost associated with higher performance optical signaling and detector components. The invention also relates to asymmetric stator pole structures for BLR motors that may facilitate reduced torque ripple and the adverse effects associated therewith in brushless repulsion motors, where the distributed signaling source and asymmetric stator pole concepts of the invention may be employed separately or in combination in a given brushless repulsion motor design.

In accordance with one or more aspects of the invention, a brushless repulsion motor is provided, comprising a stator, a signaling system, and a rotor. The stator comprises an integer number Ns stator poles and one or more field windings to produce a stator field with 2Ns torque sectors of alternating torque polarities. The signaling system includes signaling devices that operate to selectively provide a control signal for controlling rotor switching, which may be provided in sets for rotor coil shorting in positive or negative torque sectors of the stator field for motors operable to selectively run in either rotational direction. The rotor comprises an integer number Nrc rotor coil circuits that individually include a rotor coil having an integer number Nrcs rotor coil segments adapted to electromagnetically interact with the stator field. The rotor circuits also include an electronic switch circuit with one or more electronic switches that selectively short the rotor coil in response to a switch signal, as well as a signal detector. The detector receives the control signal from the signaling system when the rotor coil is in a predetermined angular position and provides the switch signal to the coil switch to short the rotor coil when the control signal is received. Importantly, each detector is angularly spaced from a closest neighboring detector by a detector angle that is greater than the coil segment spacing angle 360°/(Nrc*Nrcs). In one implementation illustrated and described hereinafter, the detector angle is about 360°/(Nrc*Nrcs) plus 360°/2Ns, wherein the invention provides significantly greater detector spacing than conventional BLR motors where the detector spacing was equal to the rotor coil segment spacing.

This aspect of the invention provides flexibility in detector location and may also include distribution of the stator-mounted signal sources (e.g., LEDs) around all or most of the stator circumference to facilitate precise control of specific rotor coils without cross talk and the resulting inadvertent shorting of non-selected rotor coils, even where the motor dimensions shrink and the number of stator poles and rotor coil segments increase. This, in turn, advantageously facilitates low cost manufacturing of high performance BLR motors using signaling and detector components that may have manufacturing tolerance variations. The detectors, moreover, need not be angularly aligned with the corresponding rotor coil as was the case in conventional BLR motors. Furthermore, the detector and signaling device spacing advantages may be employed in motors with symmetrical stator configurations wherein the individual torque sectors of the stator field have an angular length of about 360°/2Ns, as well as in BLR motors having asymmetrical stator fields.

In accordance with another aspect of the invention, the stator of the BLR motor is asymmetrical, wherein the stator includes a plurality of stator poles and at least one field winding producing a stator field, with at least two of the stator poles being different. The asymmetrical stator configuration may be advantageously employed to significantly reduce torque ripple and the adverse effects associated therewith, wherein rotor coil segments of a shorted rotor coil encounter pole tips at different coil angles to effectively spread out the peak torque through a wider angle, which may include more than one peak. The peak torque spreading effect with respect to the torque contribution of individual rotor coils, in turn, reduces the net ripple for the composite torque of the motor. The stator pole asymmetry may be created regardless of the number of poles in a particular stator, by varying the structure of the pole surfaces, such as where first and second stator poles are formed that extend along different angular lengths. Where the stator includes multiple pole pairs, the asymmetry may be implemented by providing a first pole pair having first and second poles that are substantially identical to one another and angularly offset from one another by about 180°, along with a second pole pair comprising third and fourth poles substantially identical to one another and angularly offset by about 180° from one another, where at least two of the first, second, third, and fourth stator poles are different. In another related aspect, the stator is formed using a plurality of stator laminations or sections arranged in a stack to form a plurality of stator poles, where the stator sections individually provide two or more pole portions with at least two of the pole portions being different to provide an overall asymmetrical stator for a BLR motor. In one implementation, at least two of the stator sections are angularly staggered with respect to one another in the stack with different pole portions of the two stator sections aligned with one another.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages and novel features of the invention will become apparent from the following detailed description of the invention when considered in conjunction with the drawings, in which.

DETAILED DESCRIPTION OF THE INVENTION

Figure 1A:
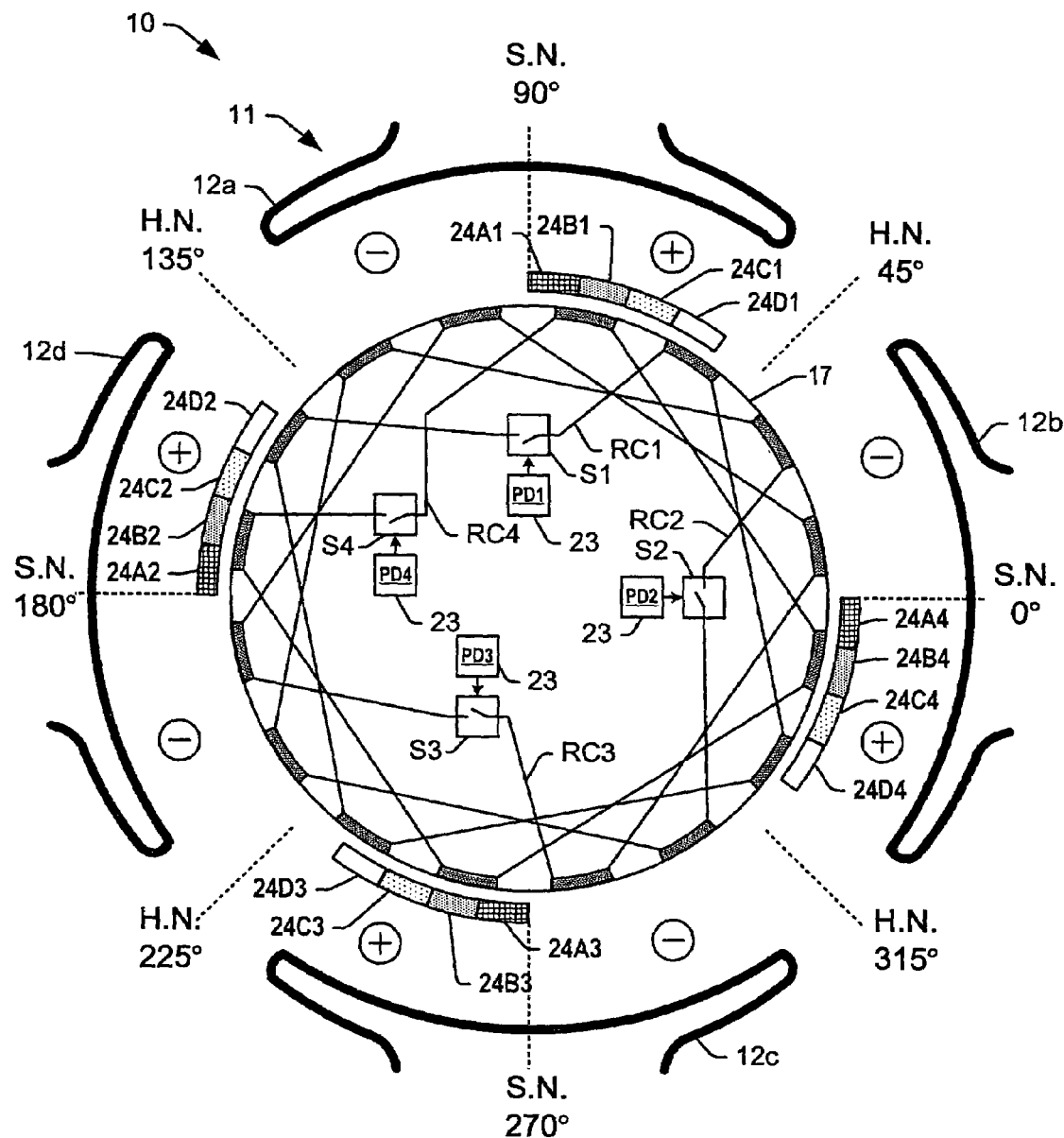
FIGS. 1A and 1B are simplified partial end elevation views schematically illustrating a four pole BLR motor with four rotor coils individually wound in a box pattern with four torque producing rotor coil segments per rotor coil, in which rotor-mounted optical detectors are aligned with corresponding rotor coils and spaced from one another by 22.5°.

One or more exemplary implementations of brushless repulsion motors are hereinafter illustrated and described in accordance with the present invention, wherein like reference numerals are used to refer to like elements throughout and wherein the illustrated structures are not necessarily drawn to scale. The invention relates to improved brushless repulsion motors in which rotor-mounted detectors and stator-mounted signaling sources are more widely spaced that in previous BLR motors to facilitate the use of increased numbers of stator poles and/or rotor coil segments while allowing selective activation of single rotor coils, as well as asymmetrical stator pole structures for alleviating torque ripple. While illustrated and described hereinafter in specific embodiments using optical signaling and detector devices, other signaling components and detectors can be used, including but not limited to optical devices, magnetic devices, RF devices, etc., wherein all such variant implementations are contemplated as falling within the scope of the present invention and the appended claims.

Figure 1B:
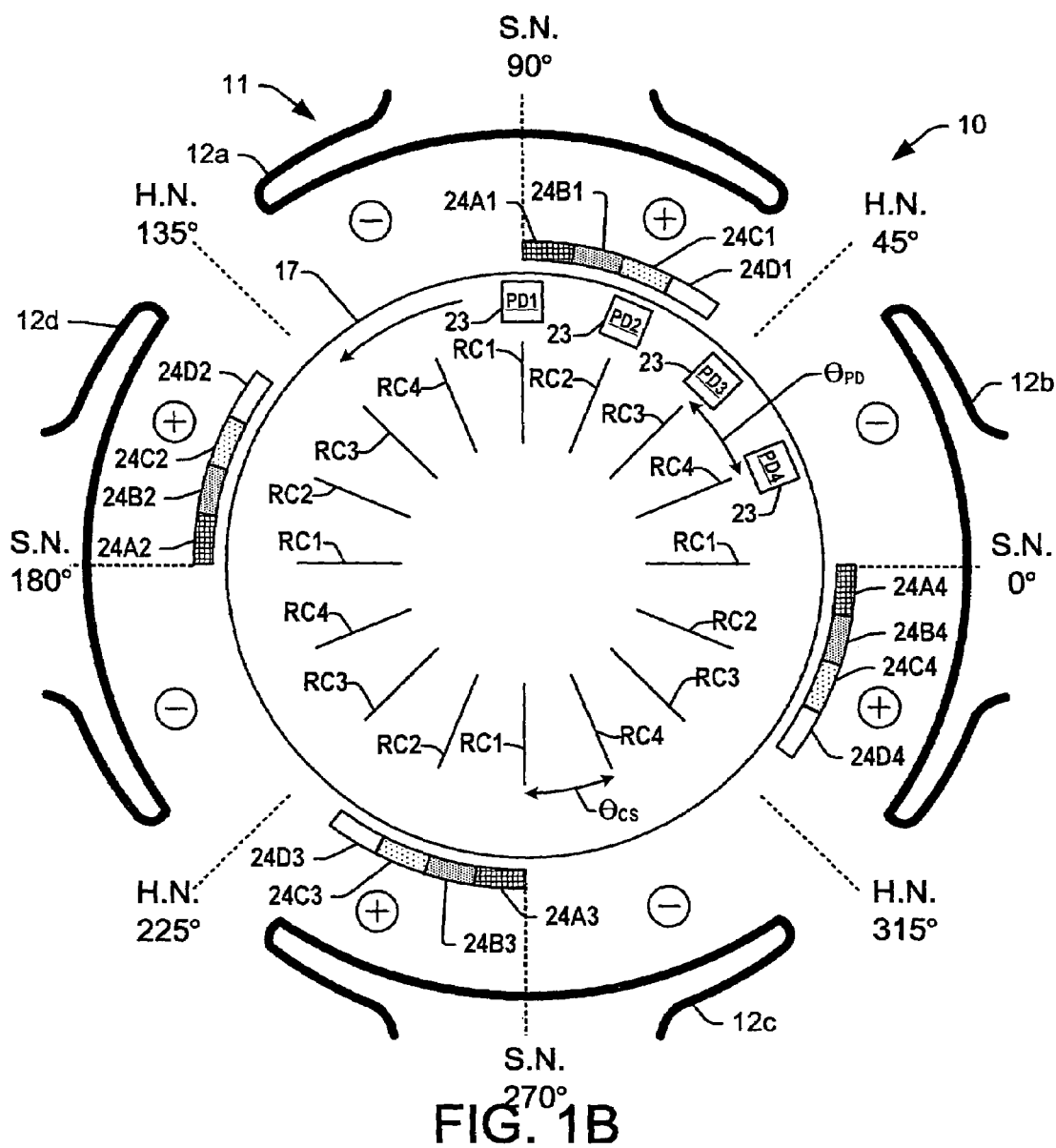

Referring initially to FIGS. 1A and 1B, in order to appreciate various shortcomings and limitations associated with conventional BLR motor designs, a BLR motor 10 is illustrated in which rotor mounted optical detectors (photodetectors 23) are associated with individual rotor coils and the detectors are angularly aligned with the corresponding rotor coils. As discussed above, this situation leads to spacing difficulties during manufacturing and possible control and performance problems, particularly where the motor dimensions are small and/or where a relatively large number of stator poles or rotor coil segments are used. The BLR motor 10 is a single-phase four pole motor with generally symmetrical stator poles 12a, 12b, 12c, and 12d located 90° apart that form a four pole stator 11 with a field winding (not shown) wound around the poles 12 for creating a stator field therebetween. When the stator 11 is energized with AC current in the field winding, the resulting stator magnetic field is such that positive and negative torque regions or sectors are established (indicated with circled "+" and "−" indicators in the figures) providing magnetic flux to a rotor 17 axially mounted between the stator poles 12. A signaling system is mounted in a fixed position relative to the stator (e.g., on a stationary printed circuit board mounted to the stator 11), which includes a first set of four signal groups associated with the positive torque sectors for controlling selective rotor coil shorting at certain positions to achieve counterclockwise angular rotation of the rotor 17. For motors designed to rotate in the clockwise direction, a similar second set of signal groups could also be mounted in complimentary positions (within the negative torque sectors) on the stator board (not shown). The illustrated signal groups are spaced from one another by 90 mechanical degrees corresponding to the 90 degree spacing of the positive torque sectors in the four pole motor, and for symmetric pole BLR motors generally, the groups of a given signaling set will be spaced at an angle of 360°/Ns, where Ns is the number of stator poles 12. The signal groups can each include any number of signaling devices 24 (e.g., LEDs in this case), where the individual groups in the illustrated motor 10 include four LEDs. One signaling group includes LEDs 24A1, 24B1, 24C1, and 24D1 in a first positive torque sector extending from a hard neutral (indicated in the figures as "H.N.") at 45° to a soft neutral ("S.N.") at 90°. Other equivalent groups are provided for positive torque (counterclockwise rotation) control, including LEDs 24A2, 24B2, 24C2, and 24D2 in a second positive torque sector from 135° to 180°, LEDS 24A3, 24B3, 24C3, and 24D3 in a third positive torque sector from 225° to 270°, and LEDS 24A4, 24B4, 24C4, and 24D4 in a fourth positive torque sector from 315° to 0°.

The rotor 17 includes four rotor coil circuits, each having a rotor coil RC (RC1, RC2, RC3, and RC4 in FIGS. 1A–1B), with each coil being would in a box type arrangement having four rotor coil segments parallel to the rotor axis that are able to produce torque when shorted, as best shown in FIG. 1A. In this particular rotor coil winding configuration, the individual coil segments of a given rotor coil RC are angularly offset from one another by 90 mechanical degrees, with coil segments of adjacent coils RC being spaced by a coil segment angle $\theta_{CS}$, in this case, about 22.5°. In general, the mechanical coil segment spacing is 360°/(Nrc*Nrcs), where Nrc is the number of rotor coils RC and Nrcs is the number of rotor coil segments per coil RC. FIG. 1B schematically illustrates the rotor coil spacing and the relative configuration of the coils RC1, RC2, RC3, and RC4, along with the placement of the corresponding detectors PD1–PD4. As shown in FIG. 1A, moreover, the individual rotor coil circuits include an electronic switch (S1, S2, S3, and S4) operable to selectively short the coil RC when a switch signal is received, where the corresponding photodetector PD provides the switching signal to the coil switch S upon receiving a control signal (e.g., light) from the stator-mounted signaling system, such that the signaling system and the signaling devices 24 thereof can effectively control rotor coil shorting to achieve controlled rotation of the rotor 17. As with conventional repulsion motors, when a given rotor coil RC is shorted in a given torque sector of the stator field, current is induced therein, which in turn creates a rotor coil field that interacts with the stator field to produce torque of a corresponding polarity, wherein shorted coils RC in the positive torque sectors produce torque tending to cause the rotor 17 to rotate counterclockwise in the figures and vice versa.

Figure 2A:
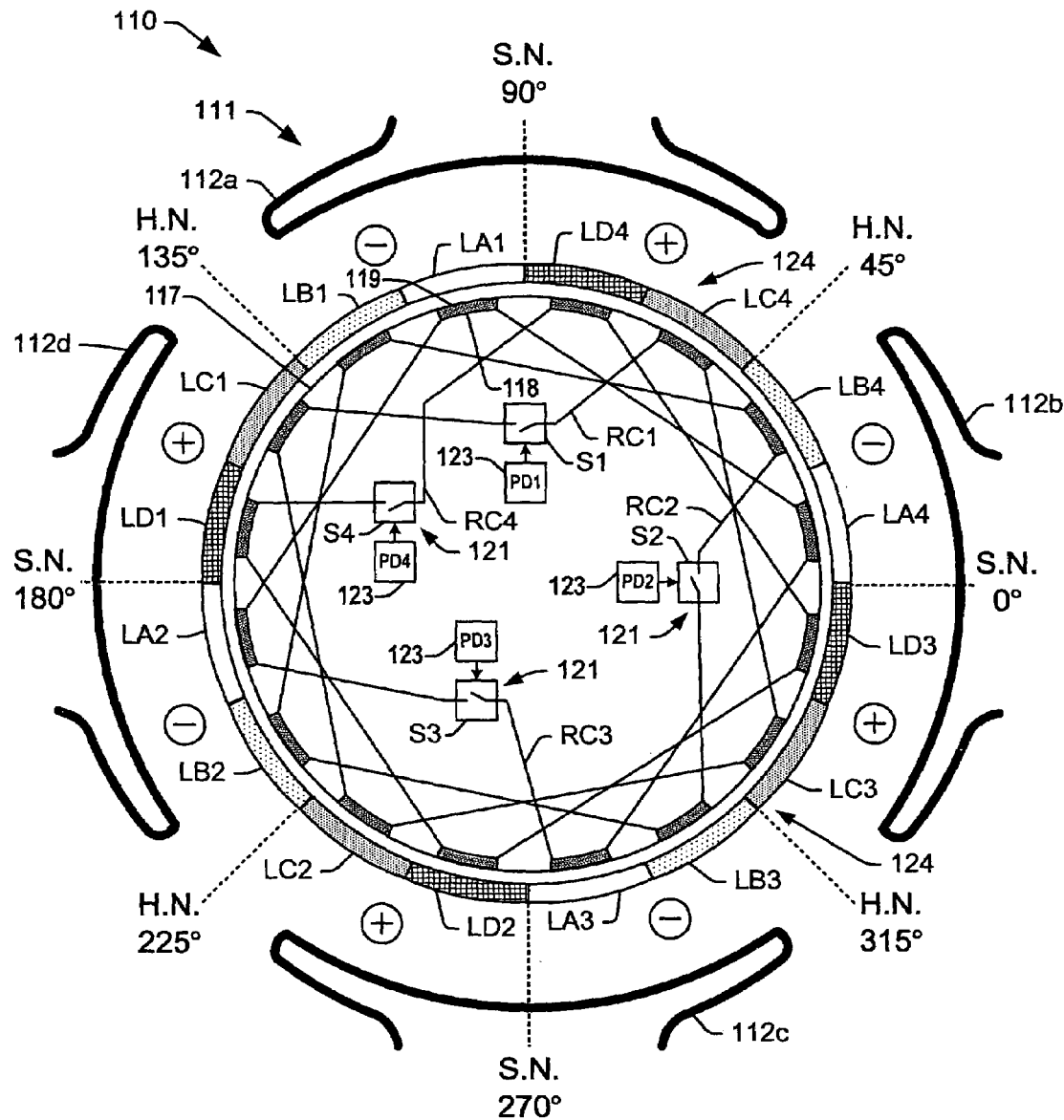
FIGS. 2A and 2B are simplified partial end elevation views schematically illustrating a four pole BLR motor having four rotor coils with four coil segments per rotor coil, where the detectors are not aligned with corresponding rotor coils and are spaced from one another by 67.5°, and where the stator signaling devices are distributed around substantially the entire circumference of the stator in accordance with the invention.
Figure 2B:
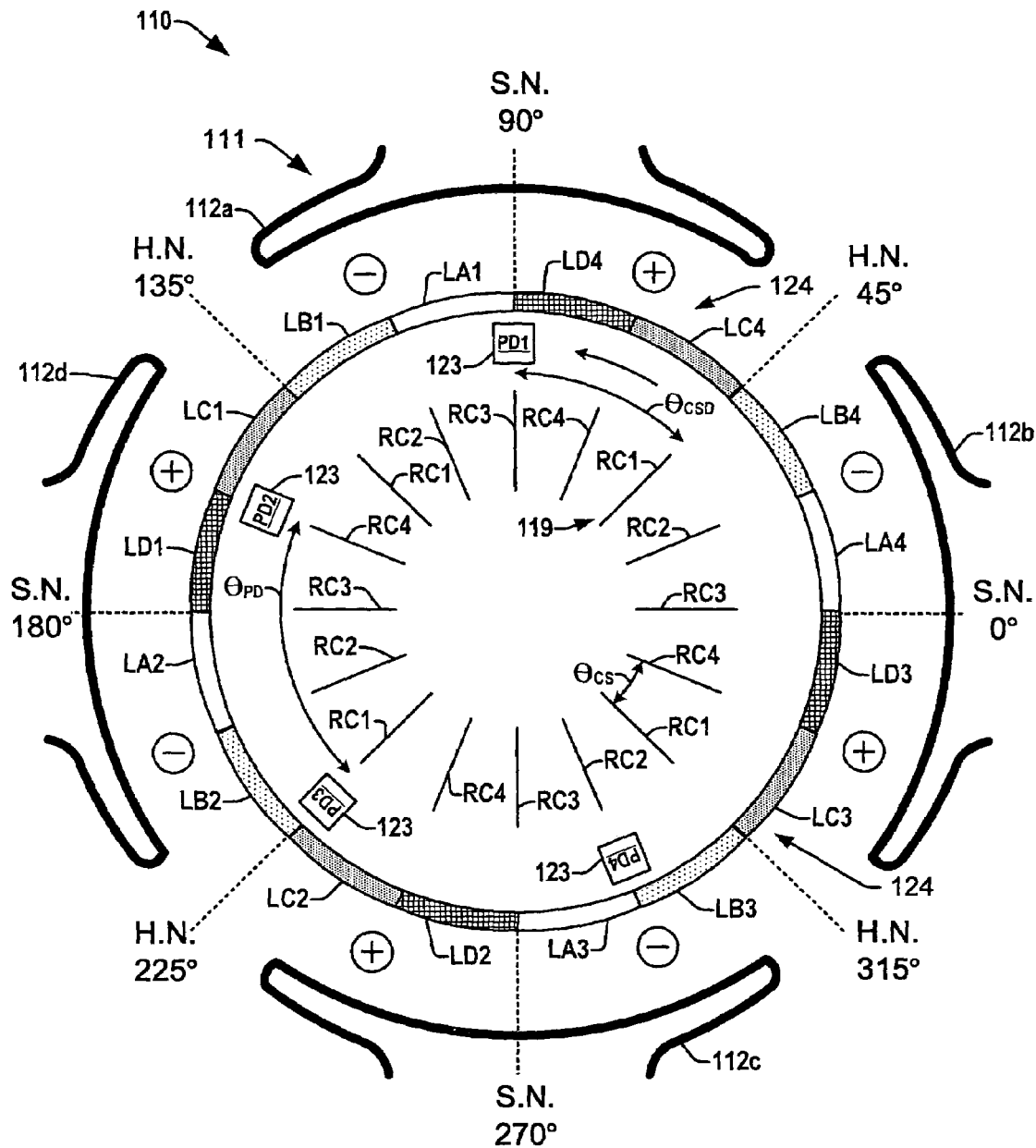
Figure 3:
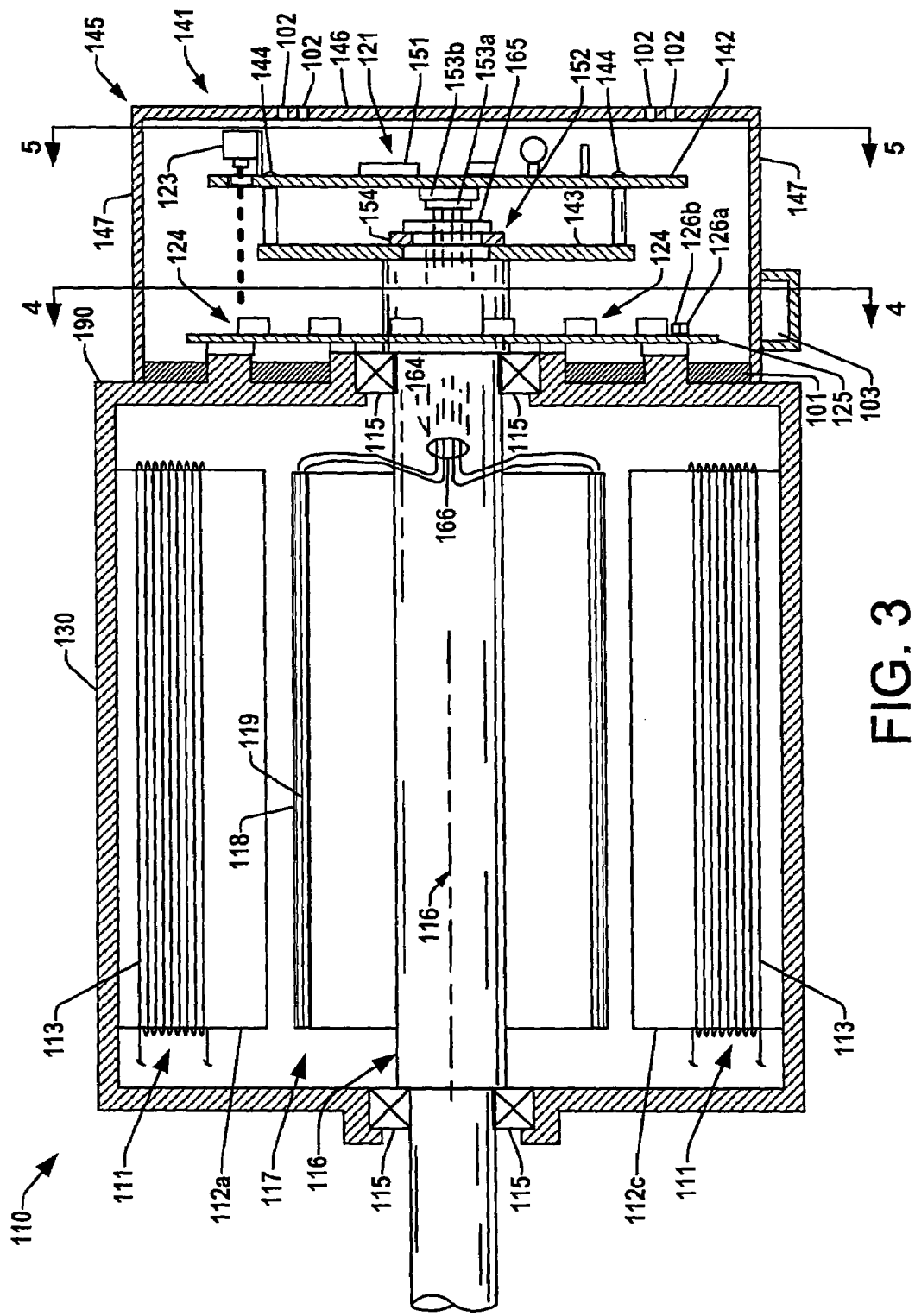
FIG. 3 is a partial side elevation view in section illustrating the exemplary BLR motor of FIGS. 2A and 2B.
Figure 4:
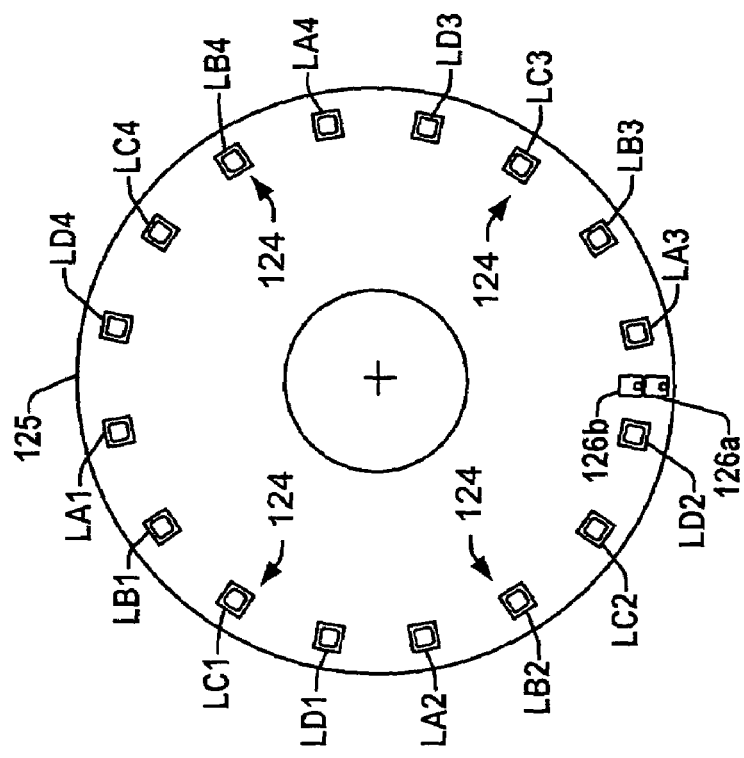
FIG. 4 is an end elevation view taken along line 44 of FIG. 3 showing a stator printed circuit board (PCB) with LED signaling devices distributed around the entire circumference having 22.5° angular lengths or spacings.

Referring now to FIGS. 2A–5, certain aspects of the invention are illustrated in an exemplary four pole brushless repulsion motor 110, in which rotor-mounted signal detectors 123 and stator-mounted signaling sources 124 are more widely spaced that in previous BLR motors to facilitate the use of increased numbers of stator poles and/or rotor coil segments while allowing selective activation of single rotor coils without inadvertently shorting non-selected coils. The BLR motor 110 includes generally symmetrical stator poles 112a, 112b, 112c, and 112d positioned 90° apart to form a four pole stator 111 with a field winding 113 (FIG. 3) wound in series around the stator poles 112. As in the above example, the four-pole stator magnetic field creates positive and negative torque sectors to interact with shorted rotor coils 119 (RC) of a rotor 117, as best shown in FIGS. 2A and 2B. In addition, a signaling system is mounted in a fixed position relative to the stator 111 on a stator circuit board 125 in FIG. 3 including LED signaling devices 124 arranged in two sets of four groups, with each group including two LEDs 124. The LEDs 124, moreover, are distributed around substantially the entire circumference of the stator board 125, where FIGS. 2A and 2B schematically show the angular positioning of the LEDs 124 in the signaling system, and FIGS. 3 and 4 illustrate LEDs 124 positioned on the exemplary stator board 125.

As shown in FIG. 2A, the rotor 117 includes four rotor coil circuits with coils RC1, RC2, RC3, and RC4, where the coils RC are again would in a box configuration with four torque producing rotor coil segments per rotor coil RC. Consequently, the segments of each coil RC are angularly offset from one another by 90 mechanical degrees, and segments of adjacent coils RC are spaced by a coil segment angle $\theta_{CS}$ of about 22.5° (360°/(Nrc*Nrcs), where Nrc is again the number of rotor coils RC and Nrcs is the number of rotor coil segments per coil RC. The rotor coil circuits also include switches indicated as S1–S4 in FIG. 2A and corresponding detectors 123 PD1–PD4, respectively. The detectors 123 and switches S are mounted on a rotor circuit board 142 (FIGS. 3 and 5) for rotation of the detectors 123 past the stator board LEDs 124 for selective activation of the switches S according to the control signals from the LEDs 124. For determining the rotor position and speed during operation, conductive markings 127 are provided on an edge of the rotor board 142 (FIG. 5), including a series of equidistant spaced marks 127 around the entire rotor board circumference, which are sensed by a photodetector 126$a$ on the stator board 125 (FIGS. 3 and 4). A special mark 127$b$ is also provided on the rotor board 142 (FIG. 5) to indicate a specific rotor position to another stator board detector 126$b$ (FIGS. 3 and 4).

Figure 5:
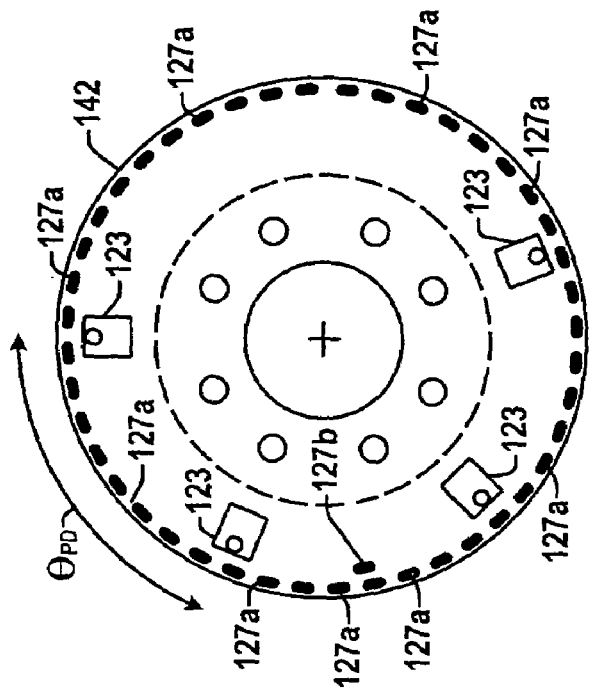
FIG. 5 is an end elevation view taken along line 5—5 of FIG. 3 showing a rotor PCB with neighboring optical detectors spaced 67.5° from one another in the motor of FIGS. 2A–3.

In accordance with an aspect of the invention, moreover, the rotor board detectors 123 are angularly spaced from a closest neighboring detector 123 by a detector angle $\theta_{PD}$ that is greater than the segment angle $\theta_{CS}$ (e.g., greater than 22.5° in the illustrated example, and greater than 360°/(Nrc*Nrcs) generally), as best illustrated in FIGS. 2B and 5. In the illustrated example, moreover, the detector angle $\theta_{PD}$ is about 67.5°, or more generally about 360°/(Nrc*Nrcs) plus 360°/2Ns, where Ns is the number of stator poles (e.g., 4 in this example). Furthermore, the illustrated motor 110 provides for detector locations that need not be aligned with the corresponding coil segments, wherein the detector 123 of each individual rotor coil circuit is angularly spaced from at least one rotor coil segment of the associated coil RC by a coil segment detector angle $\theta_{CSD}$ (FIG. 2B) of about K*360°/Ns plus an offset angle, K being a positive integer greater than 0, where the offset may be any angle including zero, in this case 45°.

As best shown in FIG. 3, the stator 111 comprises two pairs of diametrically opposed magnetic poles 112 situated on either end of a generally cylindrical stator cavity with poles 112 including field or stator windings 113 that typically are connected to 60 HZ single-phase utility power, where the stator 111 may be constructed in the same manner as is a conventional universal series motor or a repulsion motor. The rotor coil circuits include electronic switching circuits 121 (also schematically shown in FIG. 2A above) mounted on the rotor PCB 142 for selectively shorting individual rotor coils according to optical signals received from stator mounted LED optical transmitters 124 according to switching signals from corresponding optical detectors 123, also mounted on the rotor board 142. The rotor 117 is supported for rotation about a central axis 116 by axially spaced bearings 115 mounted on opposite ends of the stator 111, and includes a plurality of axial or longitudinal rotor winding slots 118 in which the rotor coil windings 119 are wound, wherein the portions of coils 119 extending within the slots 118 generally parallel to the motor shaft axis 116 generate torque through interaction with the stator field when shorted. In this regard, shorting coil 119 in the presence of the stator field causes an induced coil current, which in turn develops a counteracting magnetic force, resulting in development of a rotational torque of the rotor 117 relative to stator poles 112. Rotor coils 119 typically include many turns with each slot 118 where the coils 119 may be terminated using commutator segments or bars or other means (not shown). The optical control signals are generated by the LEDs 123 mounted on the stator PCB 125, with the electronic switches S1–S4 121 and related energizing circuitry being mounted to the rotor bard 142 to rotate in unison with the rotor 117.

The rotor and stator boards 142, 125 are located outside the stator cavity outside a motor housing 130 on or within a control module 141 for heat transfer reasons, and the rotor board 142 is interconnected with the rotor coils 119 using wires routed along the rotor shaft 116, in a slot or central hole 166, through the associated rear shaft bearing 115. The rotor PCB 142 is mounted to a base plate 143 using screws 144, where the rotor board 142 could alternatively be directly mounted to the shaft 116, in which case the base plate 143 may be omitted. The motor 110 also has a cover housing 145 with a top portion 146 and depending edges 147 extending onto an end bell 190 of the housing 130. An optional heat sink 151 may be provided on the rotor board 142 for each switching circuit S1–S4 121, and thermal isolation of the control module 141 can be augmented with insulating material 101 on the motor end plate and/or with ventilation via cooling vents 102. A quick connect mechanism 152 is provided between the control module 141/base plate 143 and the rotor shaft 116, including male and female plug in connectors 153$a$ and 153$b$, respectively, secured by a snap ring 154, wherein removing the cover housing 145 and the snap ring 154 allows easy removal of the base plate 143 from the shaft 116 for repair or replacement of switch circuits 121 or other components. The detectors 123 are mounted to the back side of the rotor board 142 (also shown in FIG. 5), with the LEDs 124 being situated on a back end of stator housing 130 on the stator board 125. As the control module 141 rotates with the rotor 117 on the shaft 116, the LEDs 124 actuate certain of the switches S1–S4 via the optical signal detectors 123, where a controller 103 may provide wiring (not shown) to each LED 124.

Figure 7A:
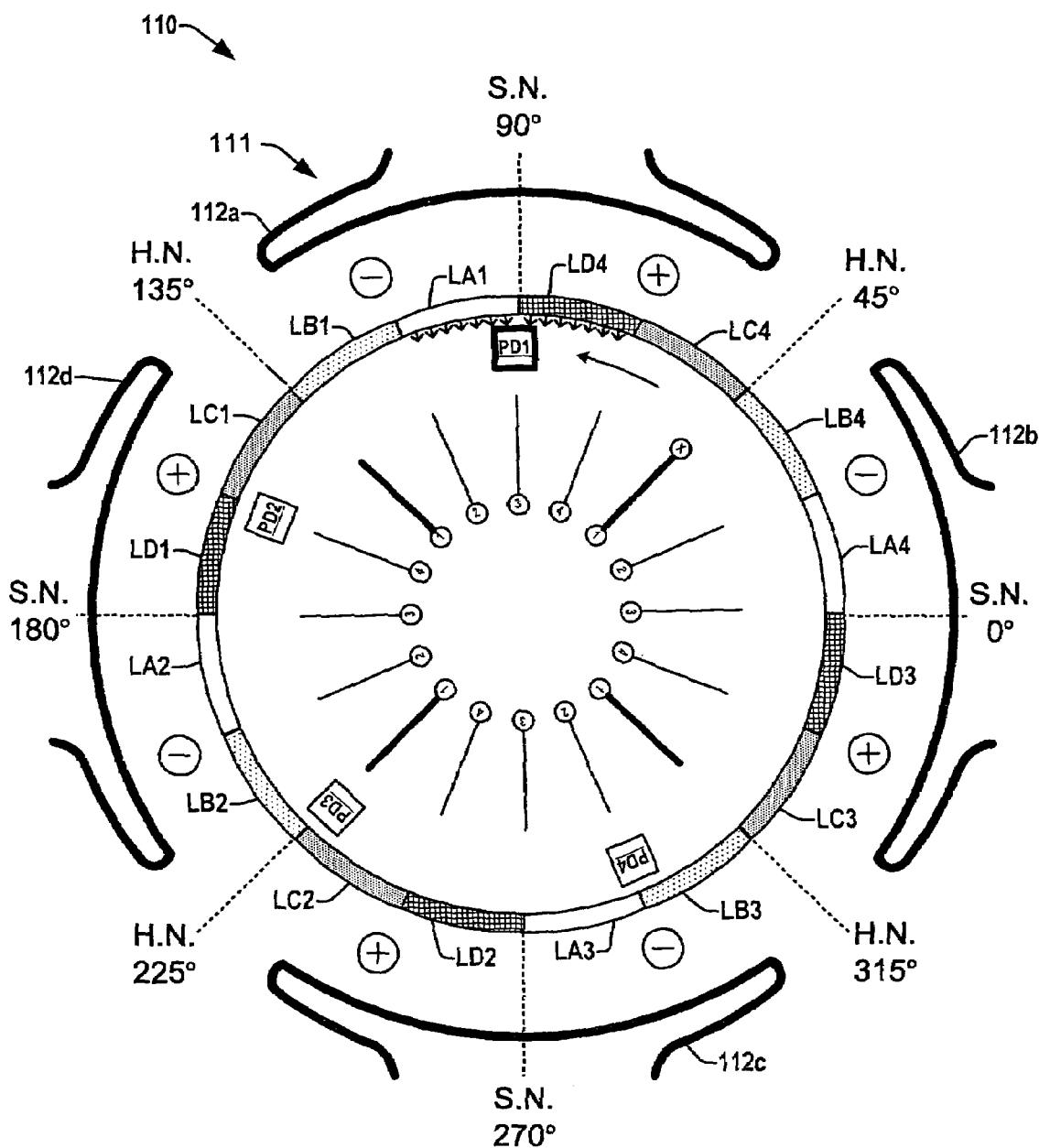
FIGS. 7A–7D are simplified partial end elevation views illustrating the BLR motor at various exemplary rotor positions with an alternative LED control scheme in which all LED signaling devices are separately controllable.
Figure 7B:
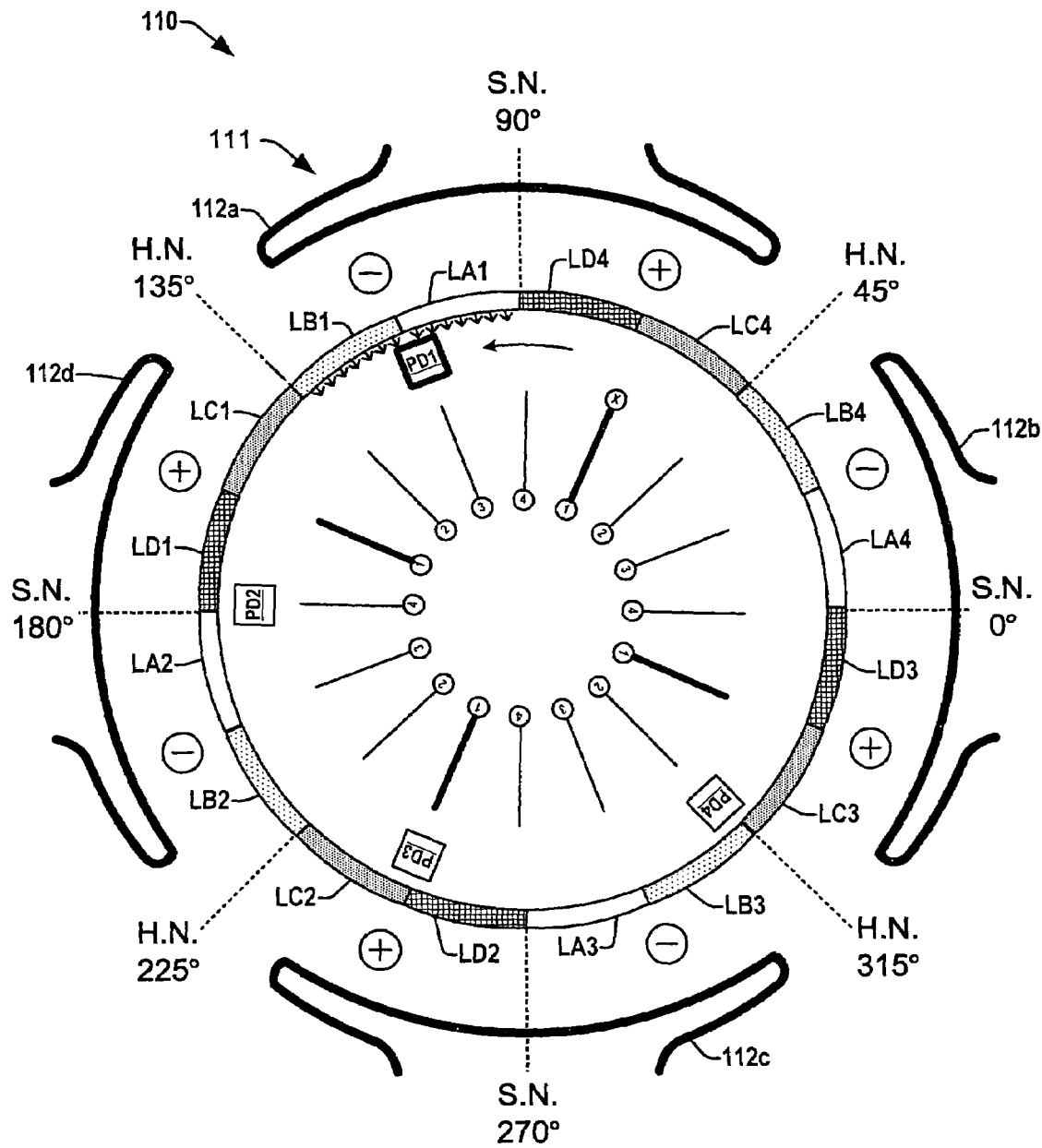
Figure 7C:
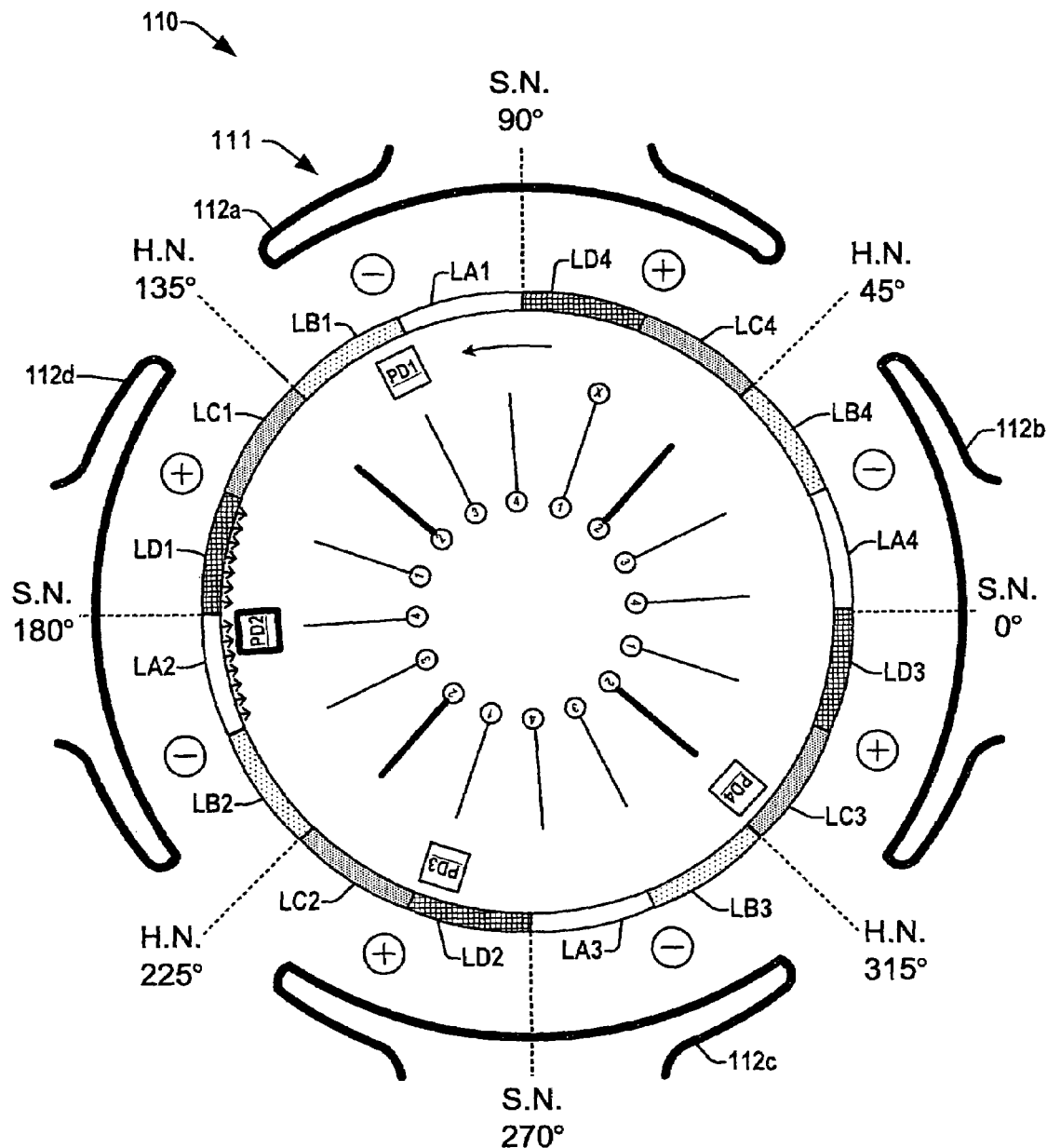
Figure 7D:
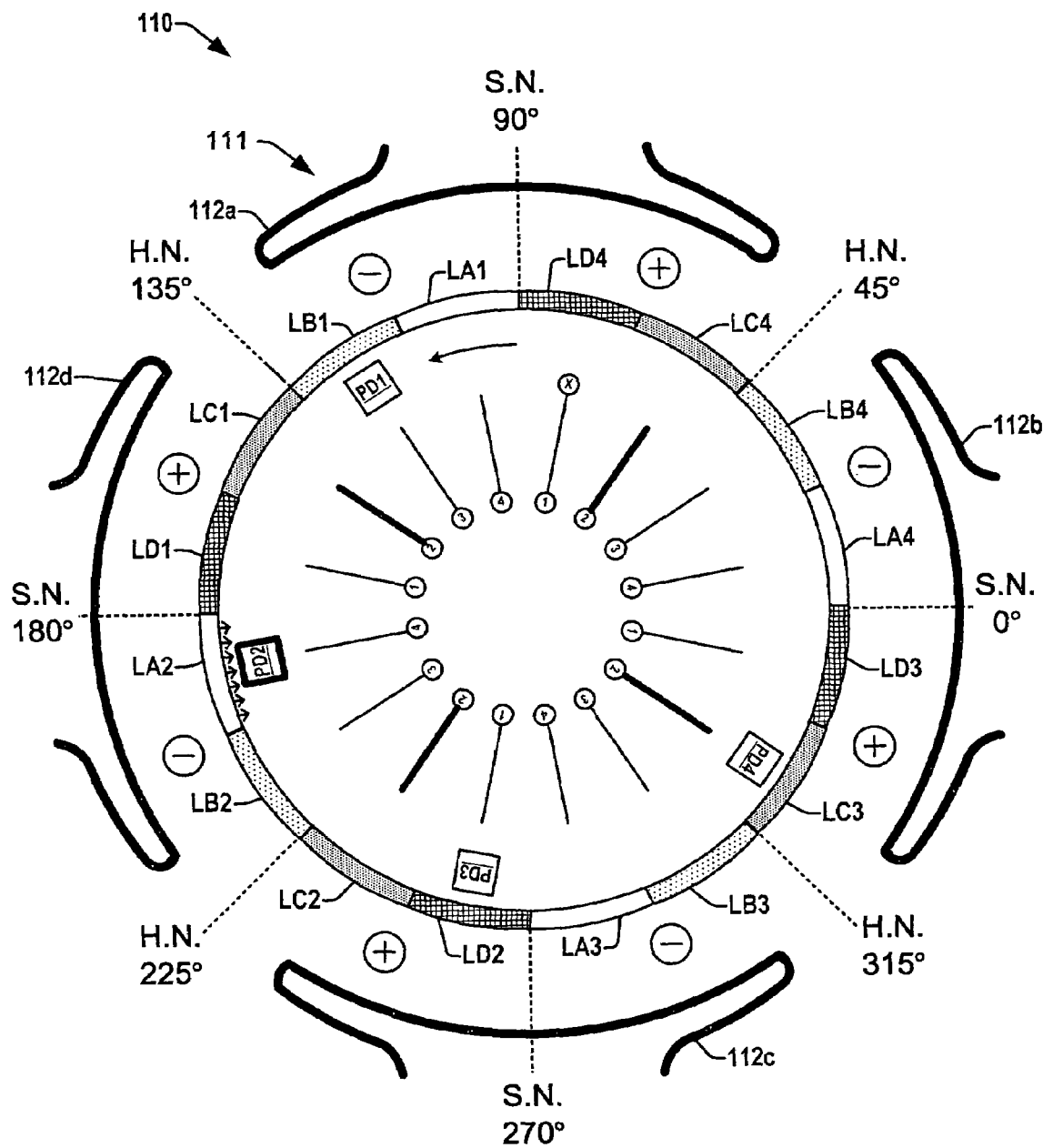
Figure 8:
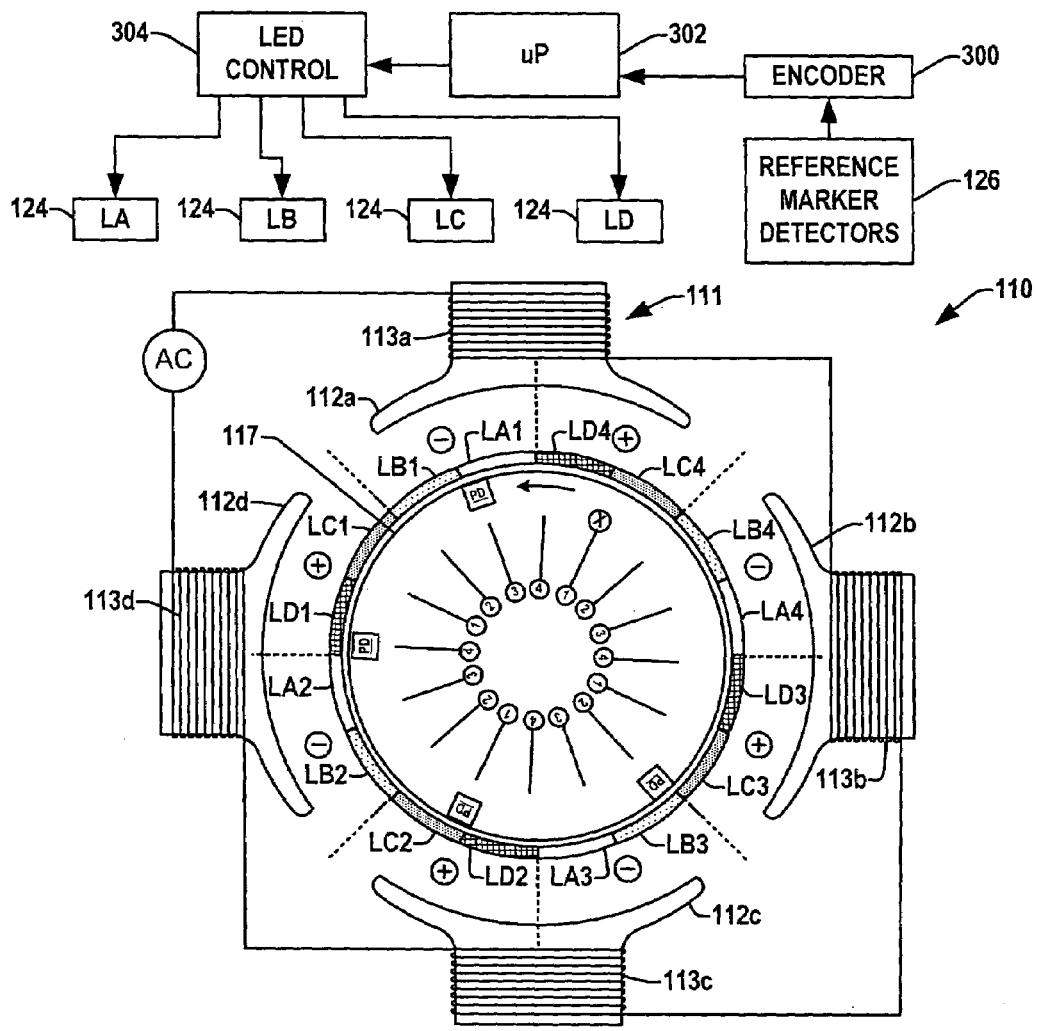
FIG. 8 is a schematic illustration of the exemplary motor of FIGS. 2A–6M, showing closed loop microprocessor-based control of the motor operation using an optical signaling system with rotor position and speed feedback provided by reference marker detectors on the stator and an encoder.

Referring also to FIG. 8, the exemplary motor 110 includes control circuitry for closed loop operation, with the stator board reference detectors 126 (126$a$ and 126$b$ in FIGS. 3 and 4) providing signals to an encoder 300 for determination of rotor speed and position using known techniques, wherein a microprocessor 302 implements a motor control strategy (e.g., torque control, speed control, etc.) using the rotor speed and position information derived from the encoder 300. The processor 302 provides timing information to an LED control component 304 (e.g., hardware, software, or combinations thereof), that controls the illumination of the sets of LEDs 124, wherein one illustrated embodiment provides for activation of LEDs LA1, LA2, LA3, and LA4 in unison. Similarly, the four LEDs 124 indicated LB are concurrently activated, as are the LEDs 124 marked LC and those marked LD in FIGS. 2A, 2B, 4, and 6A–6M. The motor 110 thus includes a first set of four signal groups associated with the positive torque sectors for controlling selective rotor coil shorting at certain positions to achieve counterclockwise angular rotation of the rotor 117. For clockwise rotation, a similar second set of signal groups is also provided, which are associated with the negative torque sectors, wherein the signal groups can each include any number of signaling devices 124. Although a number of associated LEDs from different groups may be activated together, other alternative implementations are possible within the scope of the invention, in which each LED 124 is separately controllable, as illustrated and described below with respect to FIGS. 7A–7D.

FIGS. 6A–6M illustrate the motor 110 at various exemplary rotor angles in a quarter of a mechanical revolution in the counter clockwise direction using selective shorting of appropriate rotor coils RC in the positive (+) torque sectors of the stator field. For purposes of illustration, it is assumed that the current closed loop control strategy calls for shorting the rotor coils RC within a 22.5 degree arc of the positive torque regions following the hard neutral (H.N.) locations of the stator field. In this example, the LEDs 124 labeled LA1, LA2, LA3, and LA4 are activated for counterclockwise armature rotation, beginning at an initial angle in which one of segments of the first rotor coil RC1 (the coil segment indicated with a circled "X") is at a mechanical angle of about 45°. At this position with LA1 illuminated, the first detector 123 PD1 (associated with coil RC1) receives the optical control signal from LA1 and accordingly provides a switching signal to the corresponding first coil switch S1 (FIG. 2A), causing the first coil RC1 to be shorted. In the illustrated position, a current will be induced in the shorted coil RC1 by electromagnetic interaction with the stator field, and the coil current creates a rotor field with poles that interact with the stator field, resulting in torque tending to rotate the armature in the counterclockwise direction. It is noted in FIG. 6A that the increased detector spacing of the invention reduces the possibility of crosstalk between the non-targeted detectors PD2–PD4 and the LED LA1, wherein all four LEDs LA1, LA2, LA3, and LA4 are activated concurrently in this embodiment. However, the concurrent lighting of LED LA3 may inadvertently activate detector PD4 at the rotor angle shown in FIG. 6A, although the corresponding fourth rotor coil segments of RC4 are also within positive torque sectors in this case, whereby the counterclockwise torque is enhanced.

Figure 6A:
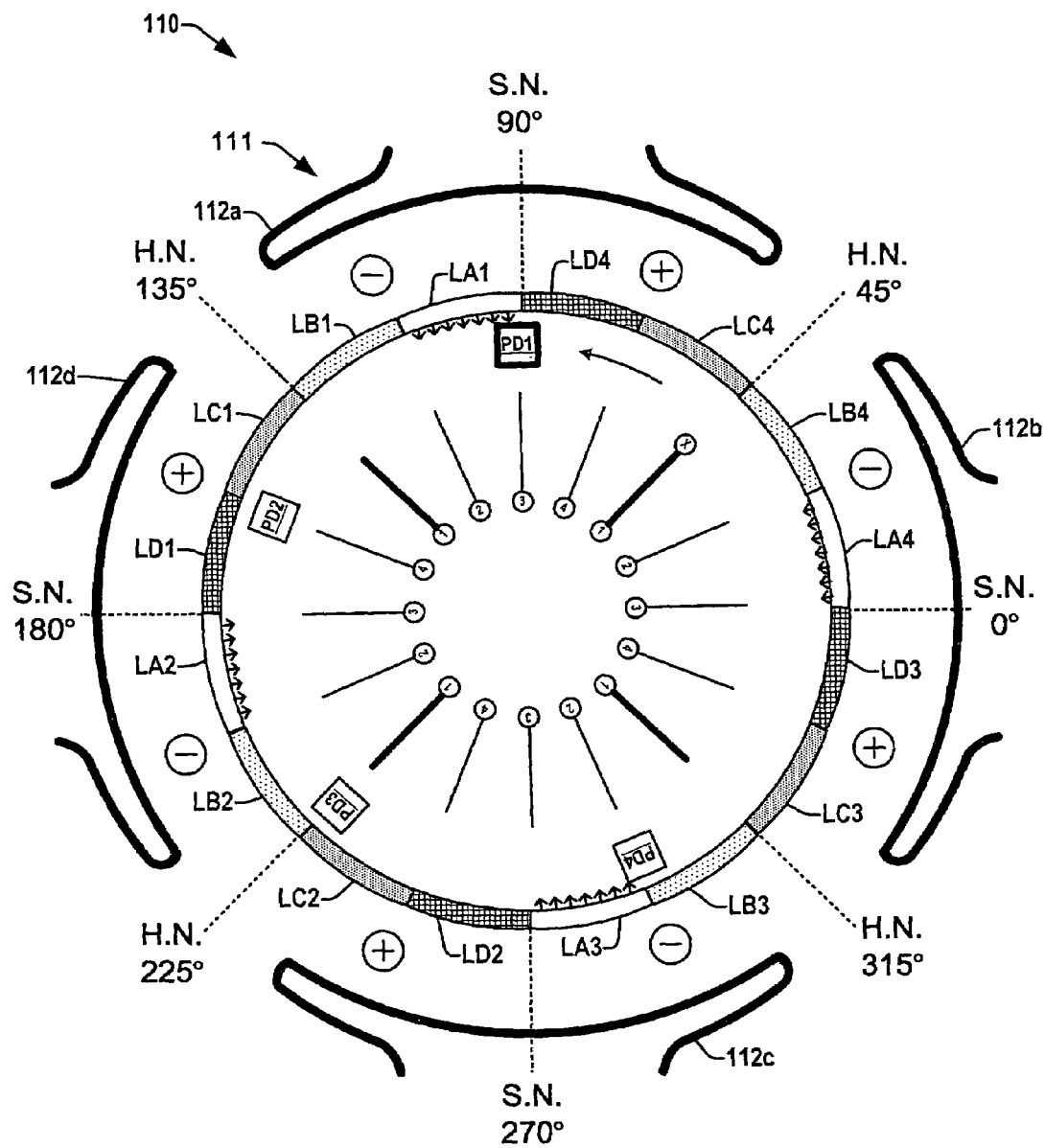
FIGS. 6A–6M are simplified partial end elevation views illustrating the BLR motor of FIGS. 2A–3 at various exemplary rotor angles in a quarter of a mechanical revolution, showing the activation of select rotor coils using four LEDs for clockwise rotation without crosstalk.
Figure 6B:
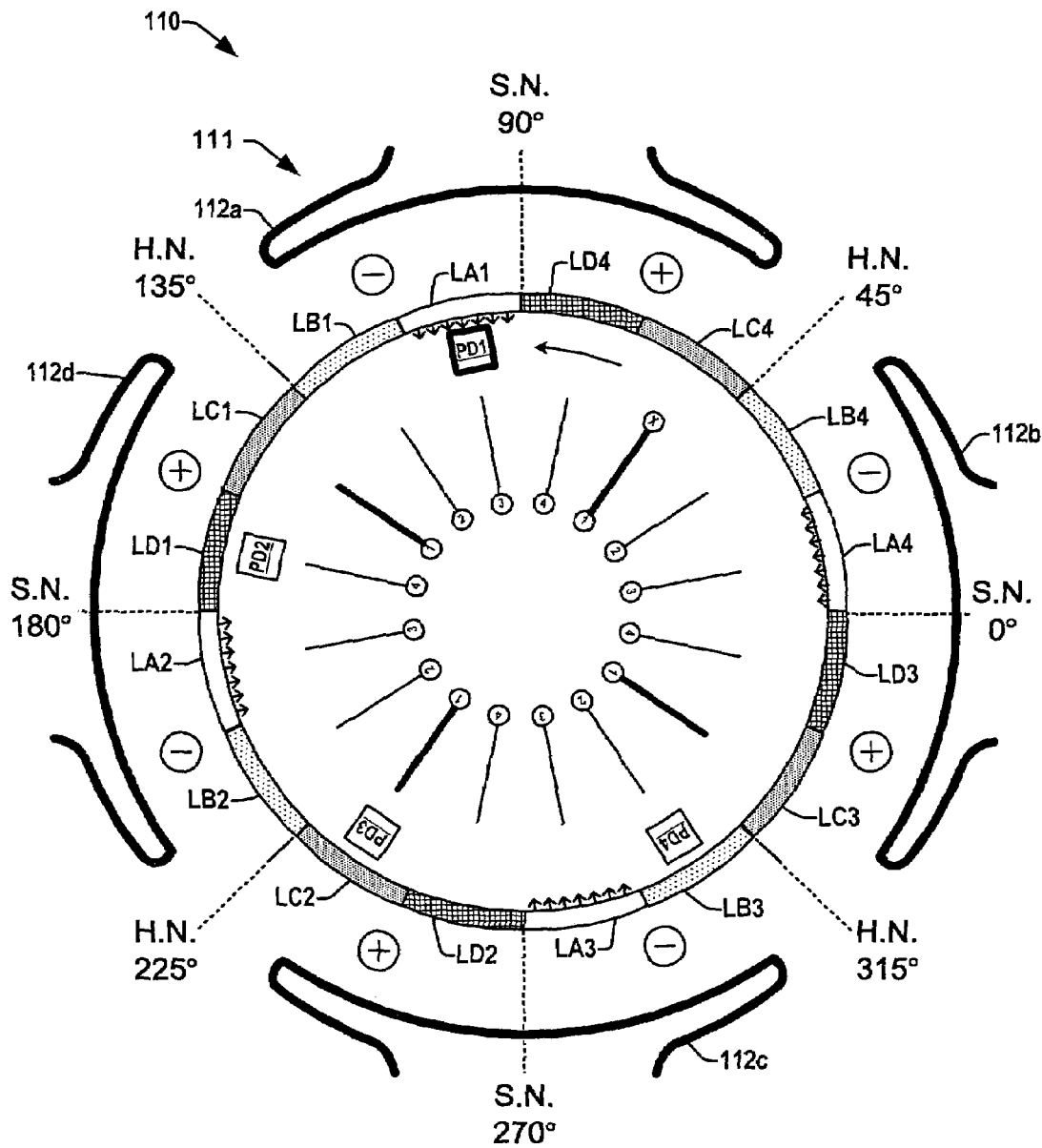
Figure 6C:
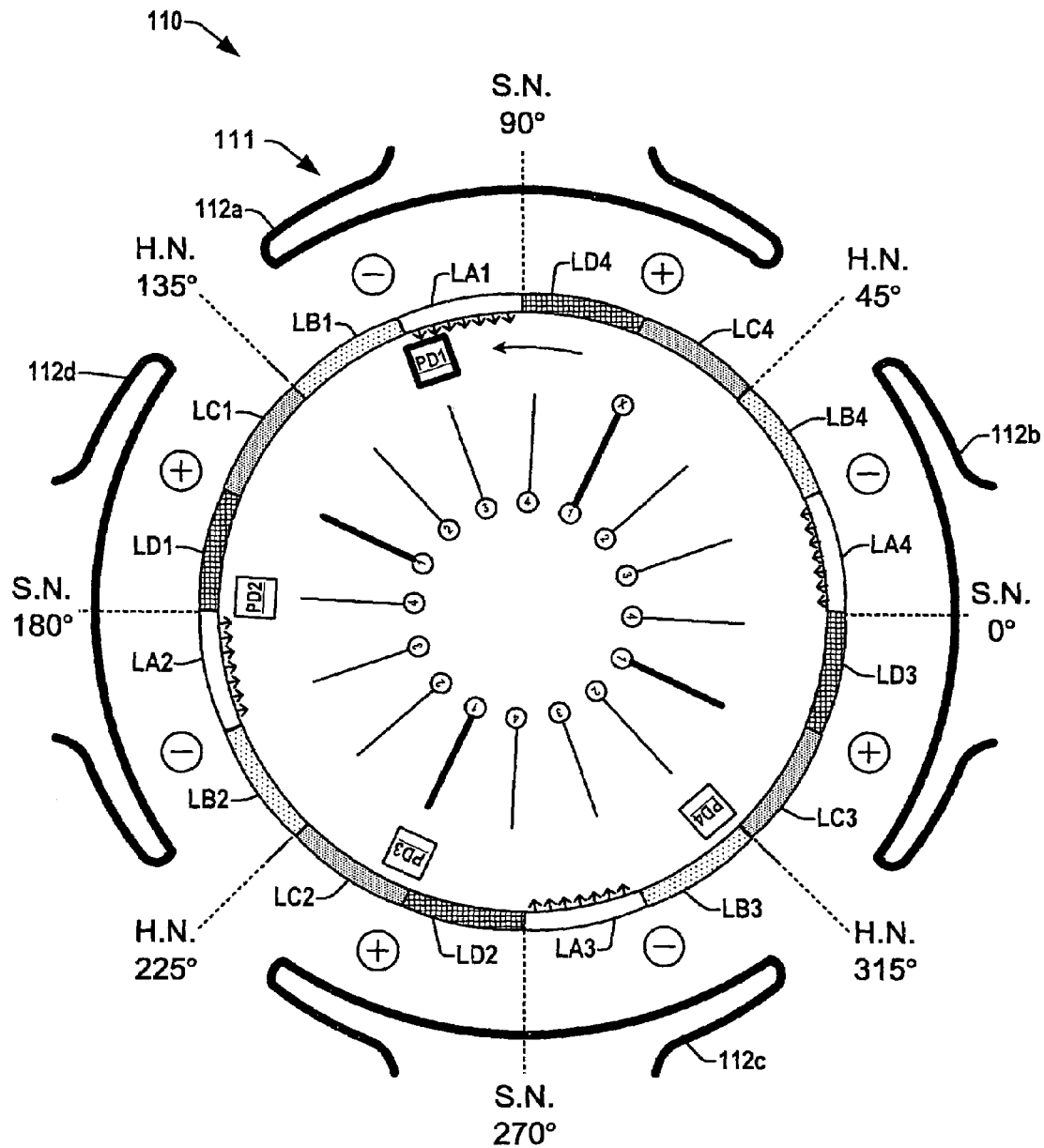
Figure 6D:
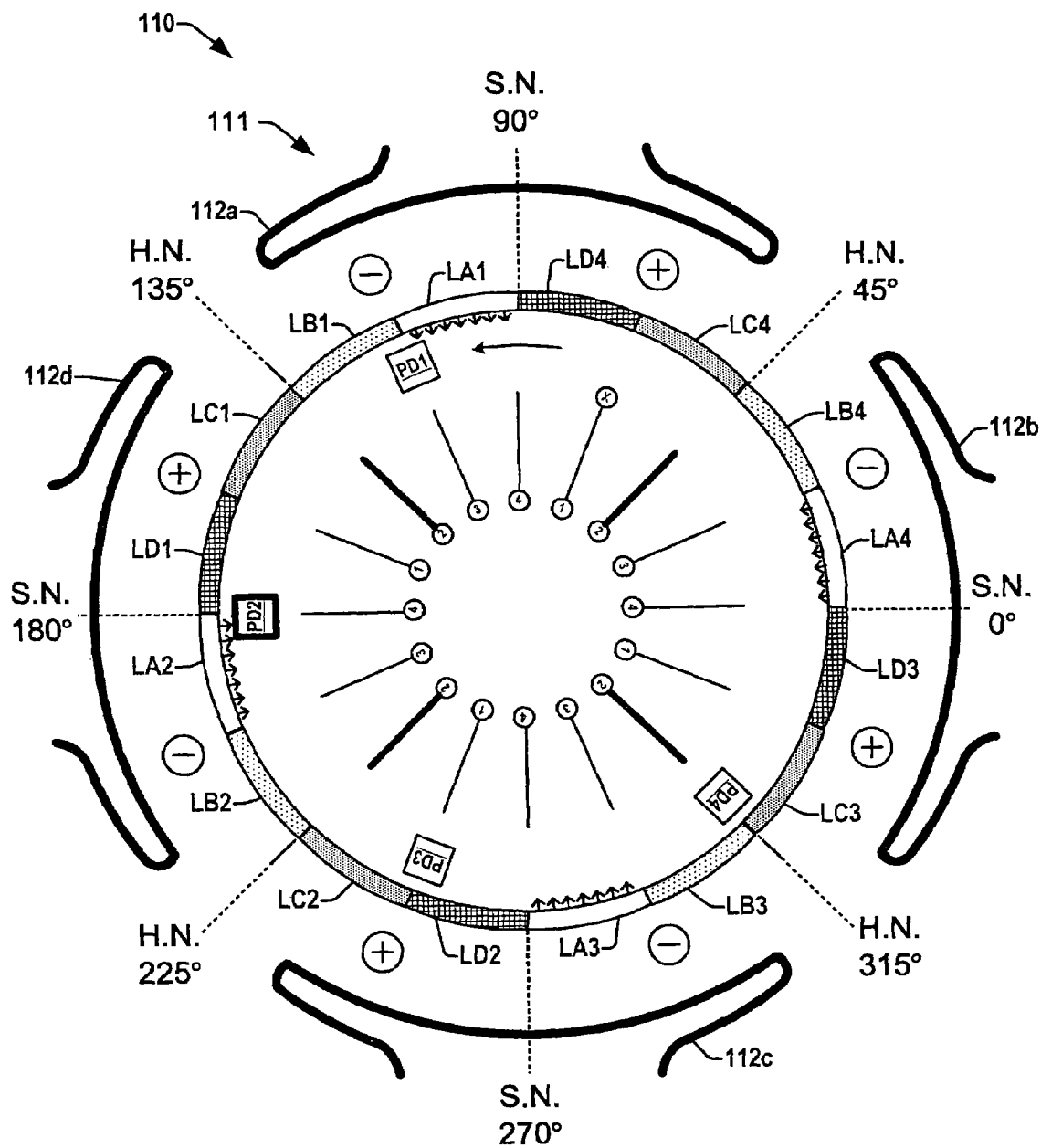
Figure 6E:
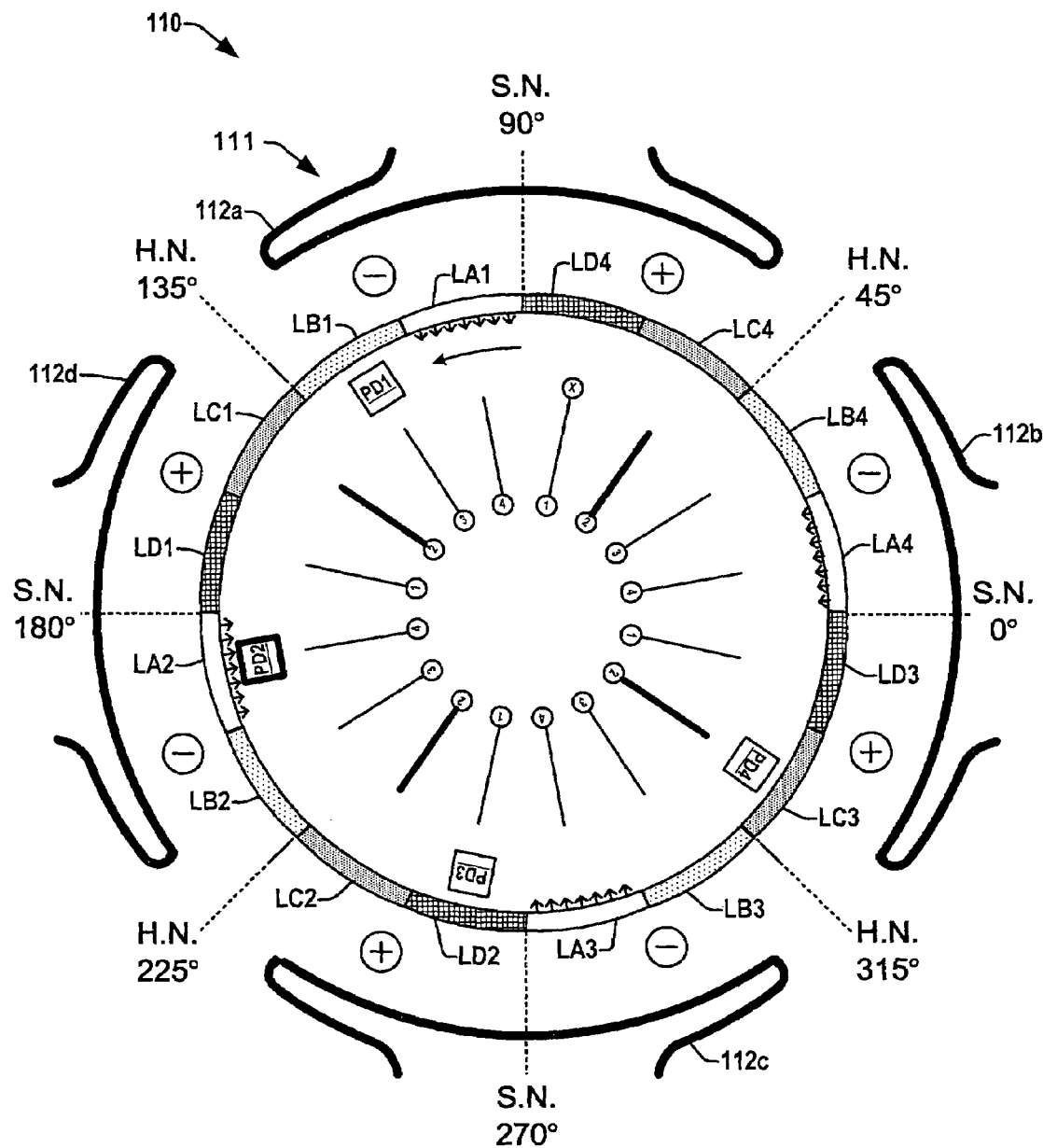
Figure 6F:
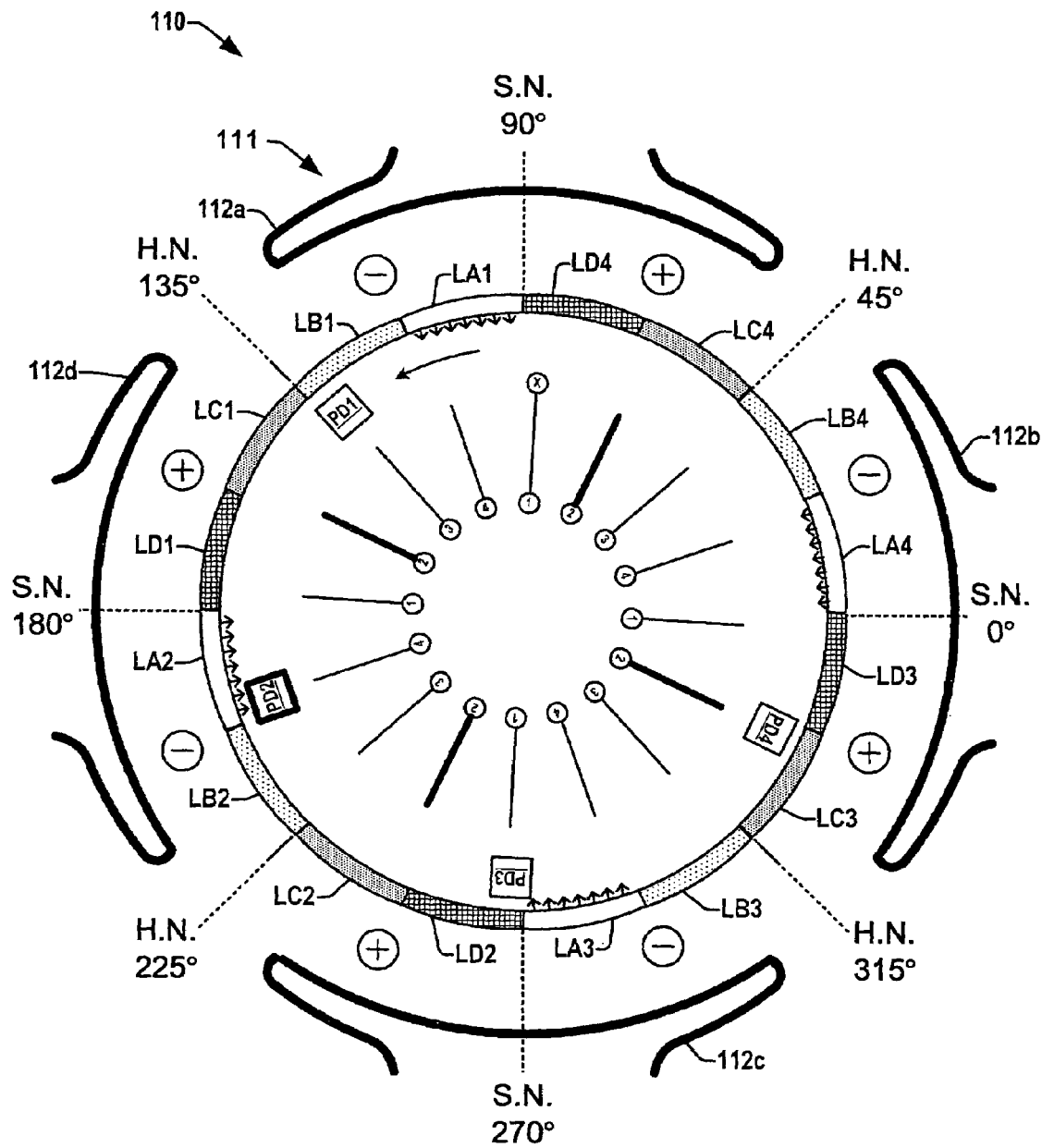

Continuing to FIG. 6B, the motor 110 is shown at another exemplary rotor angle at which the reference coil segment of RC1 (indicated by the circled "X") has now progressed to a mechanical angle of about 56.25°. LA1 remains on (along with LA2–LA4) to provide an optical control signal to detector PD1, which effectively maintains RC1 in a shorted condition for further counterclockwise torque generation by the four coil segments of RC1. In FIG. 6C, the rotation continues to the point where the reference coil is approaching an angle of 67.5° with detector PD1 near the end of the optical range of the lighted signaling device LA1. At this point, the detector PD2 of the second coil RC2 is nearing the effective optical range of lighted LED LA2, but the detector PD2 has not yet been activated. Turning now to FIG. 6D, as the reference coil passes the 67.5° angle, PD1 no longer receives a control signal from LA1, whereas PD2 now receives an optical control signal from LA2, whereby coil RC2 is shorted and begins to generate counterclockwise torque. It is noted that in this location, the four segments of the second coil RC2 have passed the hard neutral locations and are within the positive torque sectors of the stator field. Proceeding to FIG. 6E with the reference coil at an angle of roughly 78.75° and with LEDs LA1–LA4 remaining illuminated, PD2 continues to receive the optical control signal from LA2, whereas the other detectors PD1, PD3, and PD4 are outside the optical range of the illuminated LEDs LA, whereby the second coil RC2 continues to generate counterclockwise torque. RC2 continues to be shorted for positive torque generation in FIG. 6F with PD2 approaching the end of the range of LA2 and PD3 approaching the beginning of the range of lighted LED LA3.

Figure 6G:
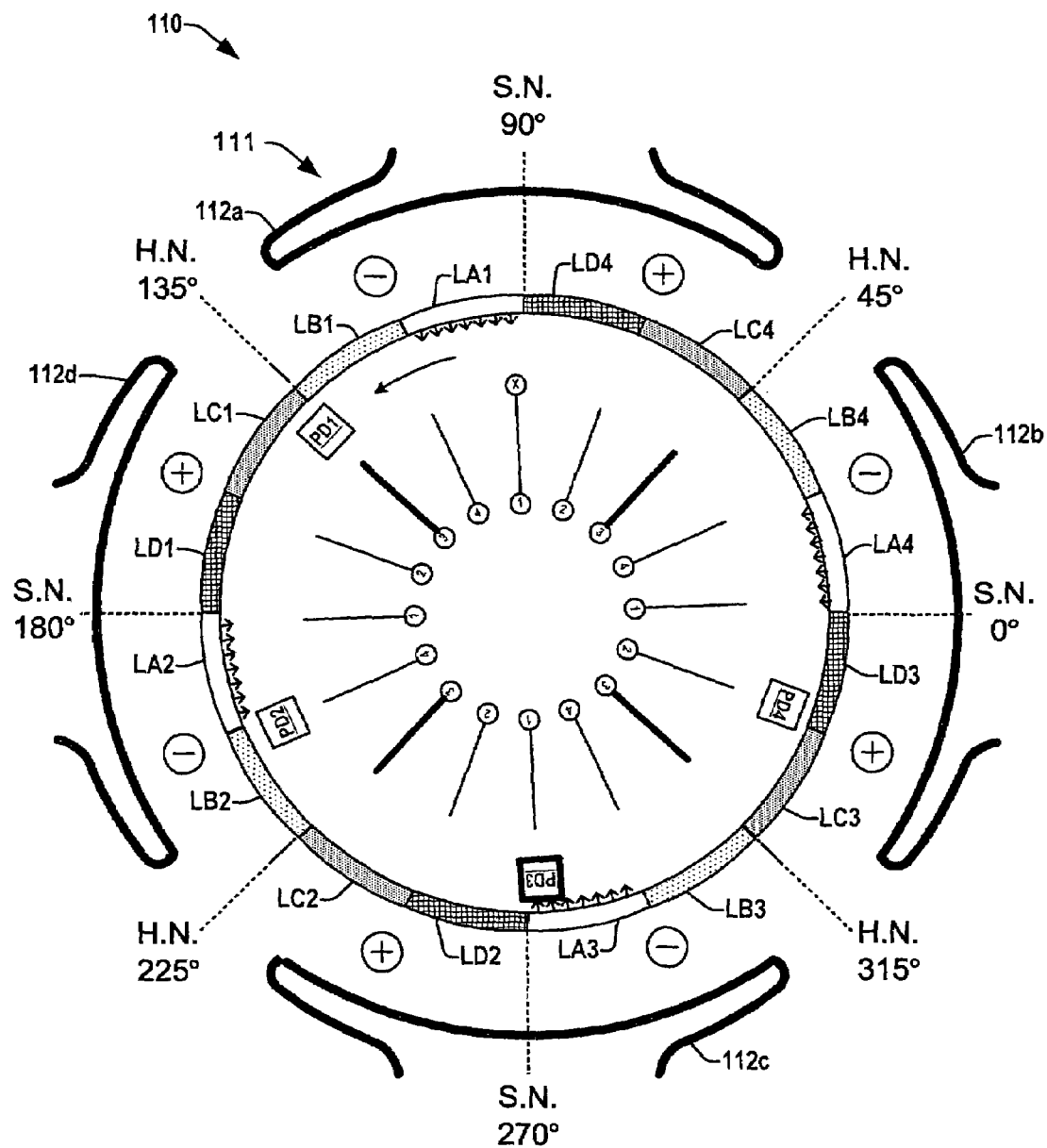
Figure 6H:
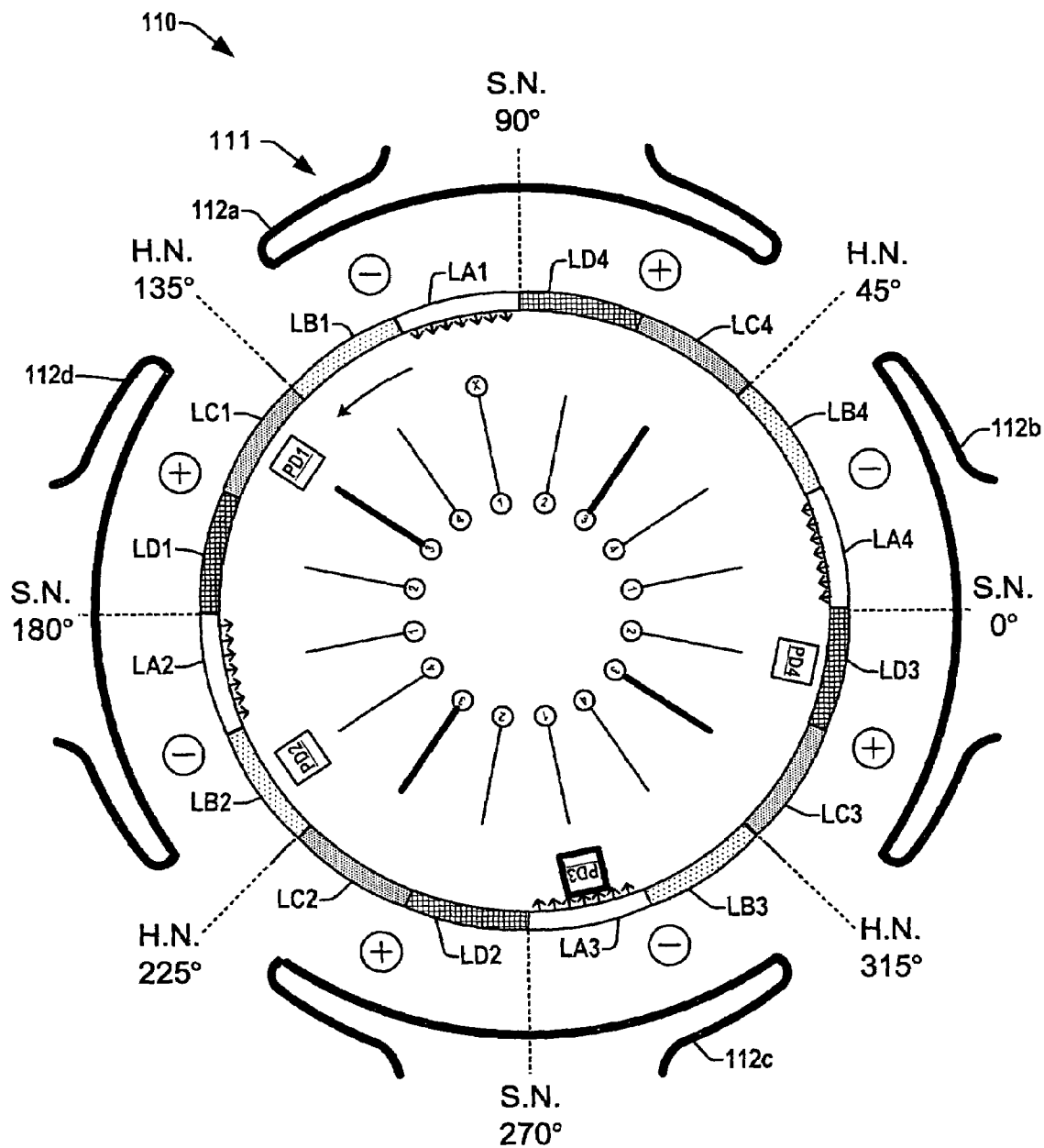
Figure 6I:
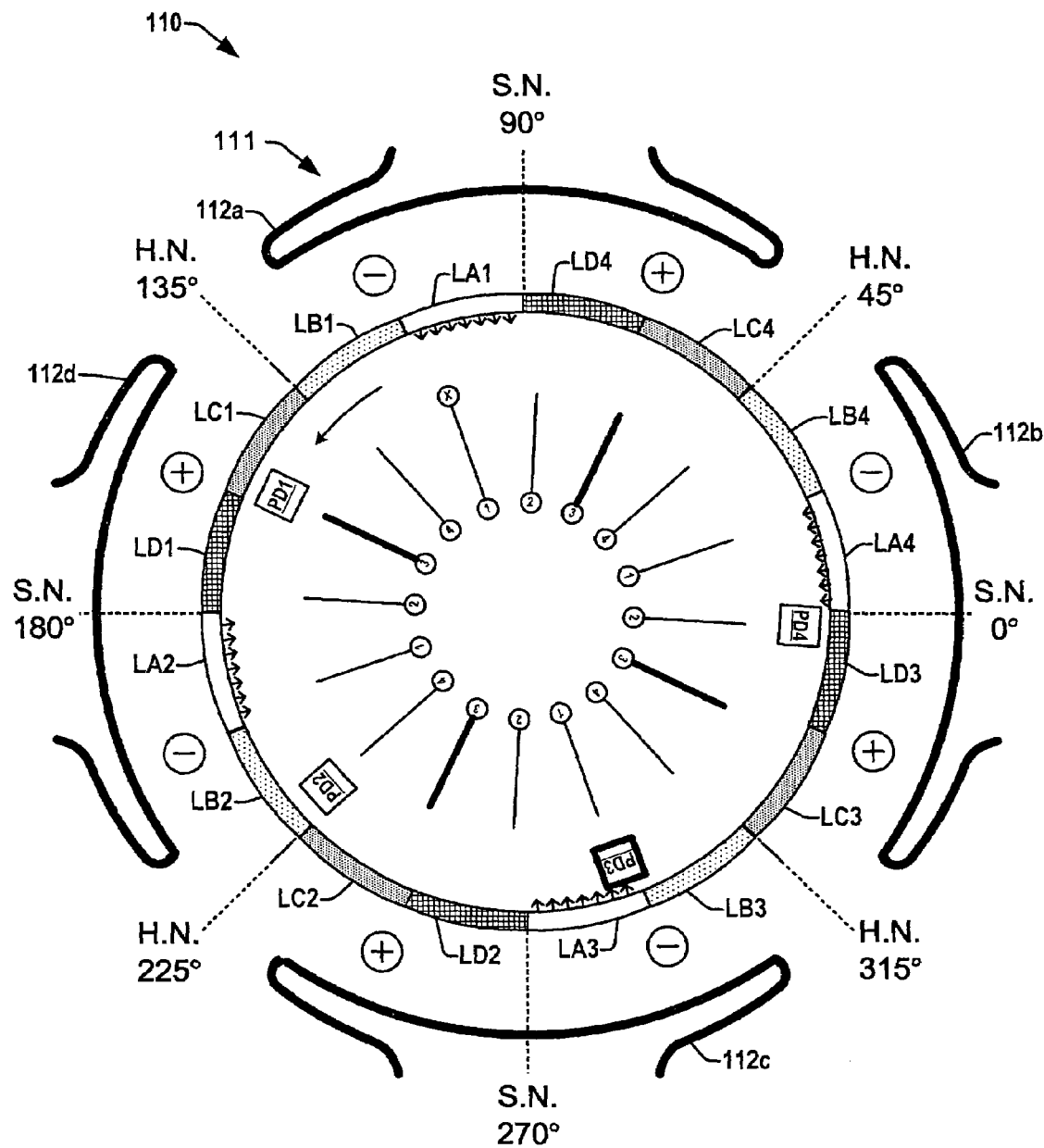
Figure 6J:
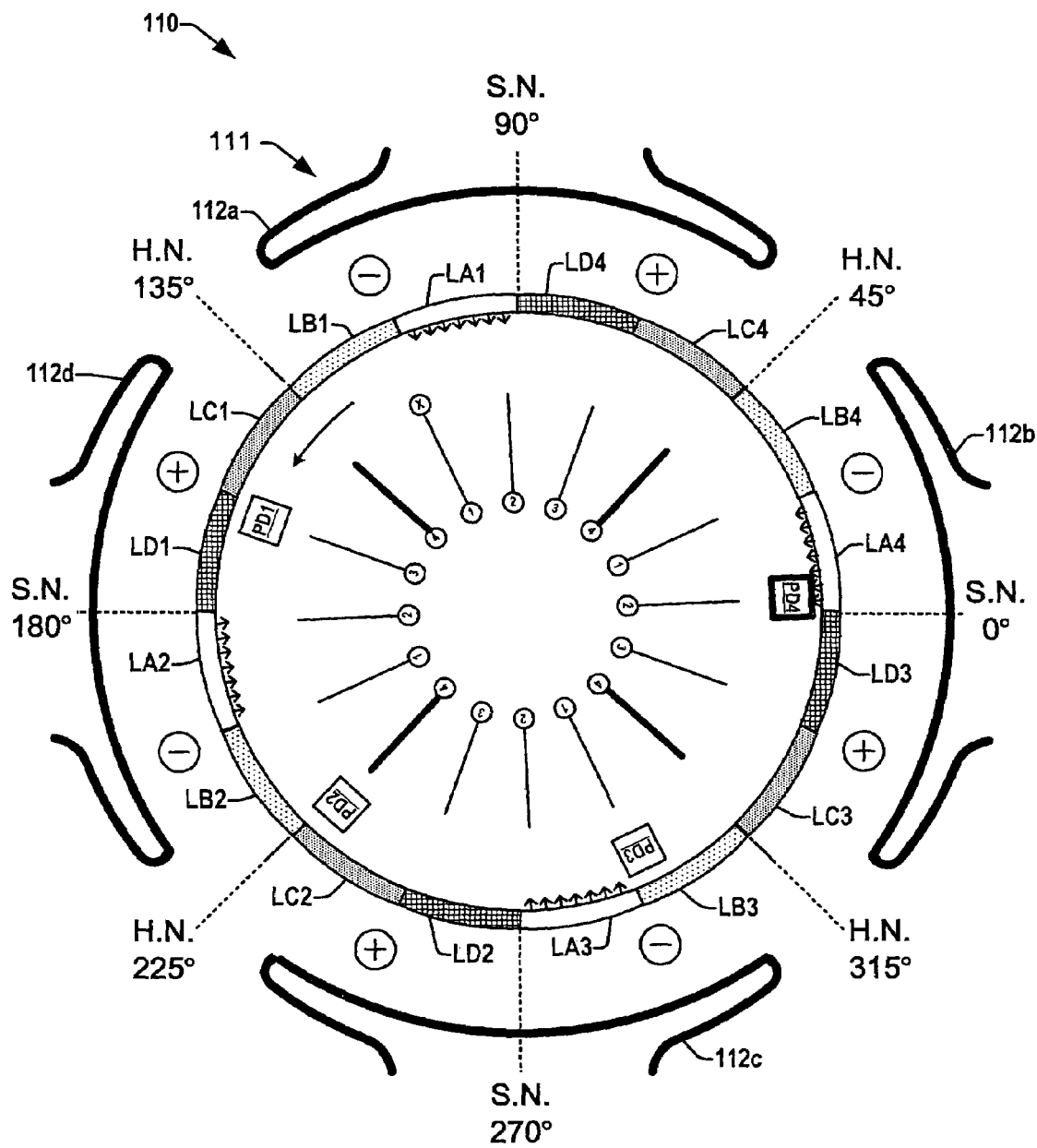
Figure 6K:
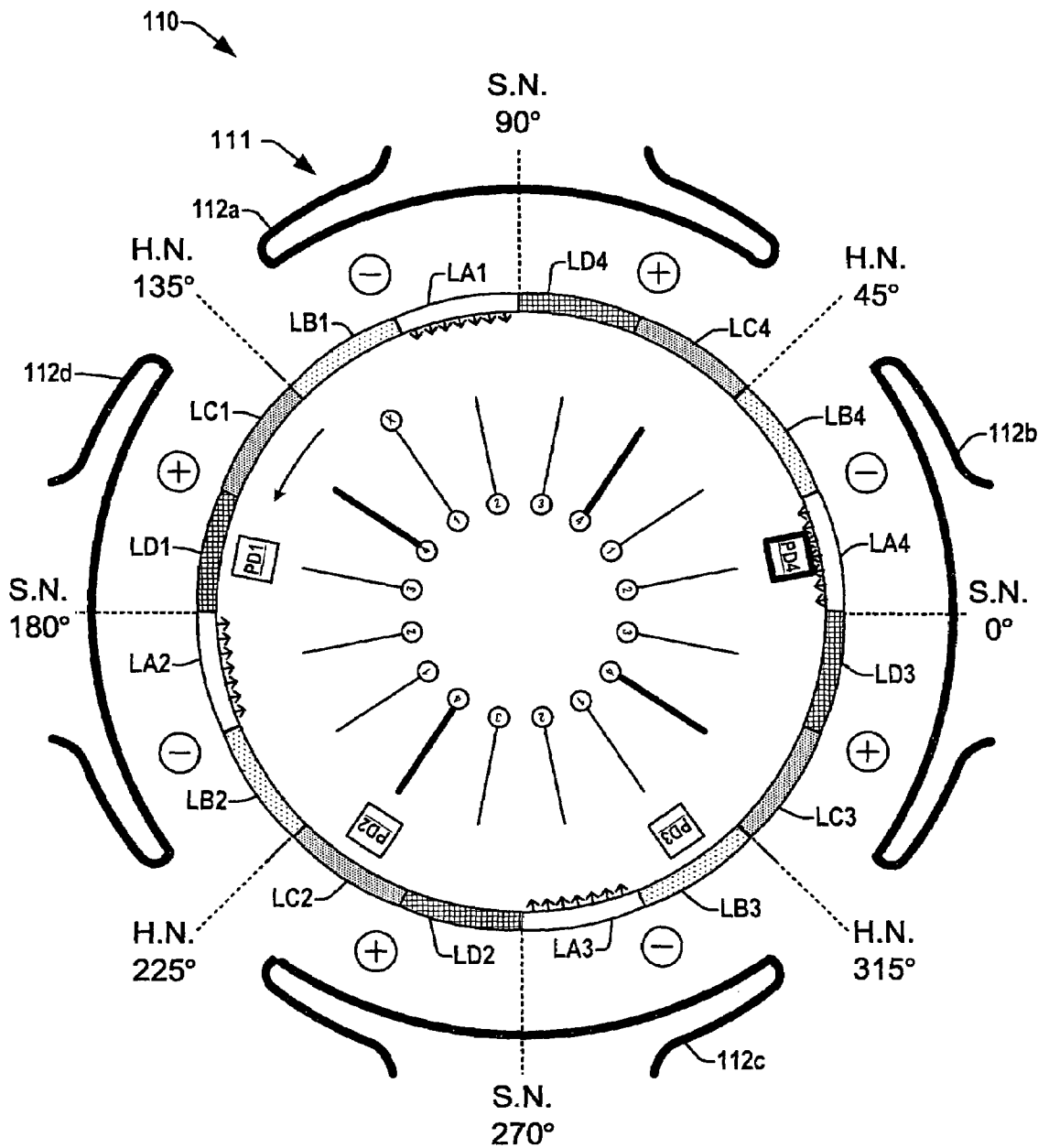
Figure 6L:
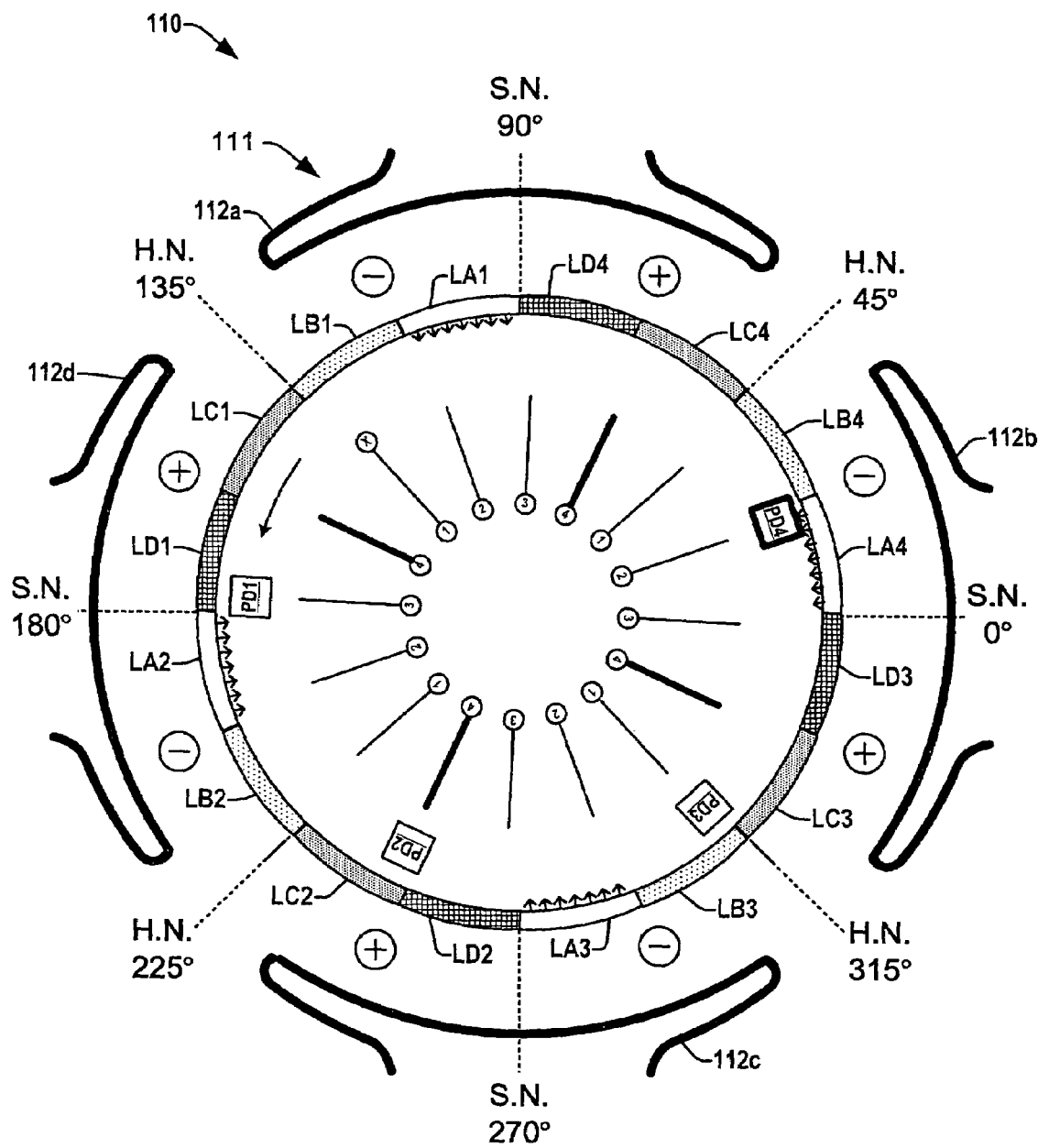
Figure 6M:
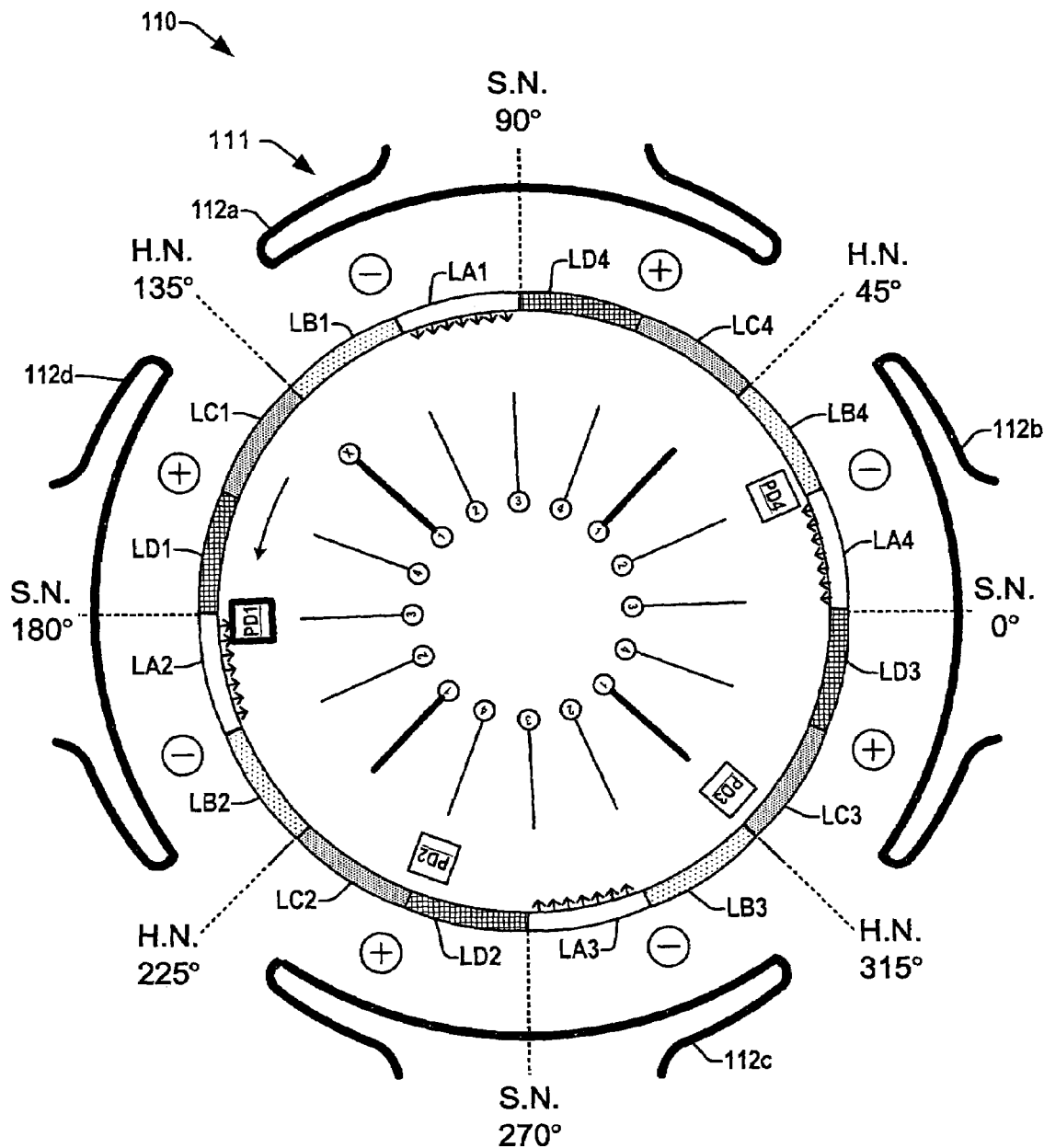

FIG. 6G illustrates the point where the rotor reference has passed 90° and PD2 is no longer activated. At this position, PD3 receives the optical control signal from LED LA3 and coil RC3 is accordingly shorted. It is noted that the torque producing coil segments of RC3 are now within the target portion of the positive torque sectors, whereas the coil segments of RC2 have left this 22.5° range. The continued illumination of LA1–LA4 provides for continued torque generation using RC3 for the reference coil angular range from 90–112.5°, as shown in FIG. 6G (angle of about 92°), FIG. 6H (101.25°), and FIG. 6I (110°). As shown in FIG. 6I, detector PD3 is exiting the range of LA3, whereas the fourth detector PD4 is nearing the range of lighted LED LA4. FIG. 6J illustrates the motor 110 at a reference position of about 114°, at which RC3 is open circuited and RC4 has been shorted by PD4 receiving an optical control signal from LA4. At this point, the segments of RC4 are just past the hard neutral locations, and the coil RC4 begins positive torque generation to continue counterclockwise rotation of the rotor 117. RC4 continues providing this rotation by virtue of the interaction of PD4 with lighted LED LA4, as further illustrated in FIG. 6K (reference angle of about 123.75°) and FIG. 6L (reference angle of about 133°). FIG. 6M shows a point with reference angle just past 135°, at which the coil segments of RC1 have now again entered the positive torque sectors just past the hard neutrals. At this angle, the first photodetector PD1 begins receiving a control signal from lighted LED LA2, and the first coil RC1 is again shorted to begin producing counterclockwise torque.

The above described operation may be continued for further quadrants of a given mechanical revolution of the rotor 117, wherein the simple control scheme allows selective activation of individual coils for the entirety of the 22.5° portion of the positive torque sectors following the hard neutrals by simply lighting the four LEDs LA1, LA2, LA3, and LA4. In this implementation, if it is desired to short individual rotor coils in the 22.5° portions of the positive torque sectors preceding the soft neutral locations (for counterclockwise rotation), the LEDs LB1, LB2, LB3, and LB4 could all be continuously illuminated. For coil shorting throughout the entire positive torque regions, eight LEDs LA1, LA2, LA3, LA4, LB1, LB2, LB3, and LB4 could all be activated continuously. Where a current control strategy requires that the rotor coils be shorted in less than the entire extent of one of these 22.5 degree portions of the positive torque sectors, timing control of the LEDs 124 can be used such that the appropriate LEDs are illuminated for only a portion of the time in which the detector of a selected coil is within the optical range of the LED. For instance, in the above illustrated example of coil activation in the positive torque sectors following the hard neutral locations, the microprocessor 302 can instruct the LED control 304 to activate LEDs LA1–LA4 as the coil segments pass the hard neutral location, and thereafter to turn off the LEDs when the selected coil segments reach a certain angle (e.g., while the corresponding detector 124 is still within the range of one of the LEDs LA1–LA4). Alternatively, the LEDs LA1–LA4 could be activated at a time when the selected coil segments are a certain angular distance past the hard neutrals, and thereafter deactivated when the coils reach a second angular position within the sector portion controlled by LA1–LA4, including 22.5° past the hard neutrals. Similar timing control of LB1–LB4 could be provided for shorting rotor coils RC within sub portions of the 22.5° portions of the positive torque sectors preceding the soft neutrals. In another possible situation, it may be desirable to activate the rotor coils for more than 22.5° but less than 45° within the positive torque sectors, wherein cooperative timed control of LEDs LA1–LA4 and LB1–LB4 can be employed in order to control the rotor coil shorting for positive torque generation according to any desired angle ranges within the positive torque sectors.

Furthermore, it is noted that timing control can be employed to mitigate crosstalk in the motor 110, even in the above embodiment where the four LEDs LA1–LA4 are activated as a group. For instance, at the reference angle shown in FIG. 6A (slightly past 45°), where the optical range of the LEDs LA1–LA4 extends farther than 22.5 mechanical degrees, there may be a chance that PD4 and PD1 will both receive a control signal at the same time, in which case both the first and fourth rotor coils RC1 and RC4 could be shorted concurrently (by detector PD1 receiving a light signal from LED LA1 while detector PD4 receives light from LA3) absent timing control of the LEDs LA1–LA4. In this regard, imperfections or variances in performance in the LEDs 124, light dispersion effects, imprecise location of the detectors 123 and/or the LEDs 124, and other component or manufacturing tolerance variations may contribute to the possibility of such overlapping detector activation. However, timing control of the LEDs LA1–LA4 can be used, for example, to selectively turn the LEDs off for a time while the rotor coil segments cross the hard neutral locations. Moreover, complimentary LED activation can be employed for clockwise rotation of the rotor 117 according to the foregoing principles using LEDs LC1–LC4 and/or LD1–LD4, with or without timing control, for shorting rotor coils RC when the torque producing coil segments thereof are within the negative torque sectors of the stator field to generate clockwise (negative) torque.

Referring briefly to FIGS. 7A–7D and 8, another possible embodiment allows the LEDs 124 to be individually controlled via the microprocessor 302 and the LED control 304 (FIG. 8), wherein the control system 304 would be connected to provide separate signals to each of the LEDs 124 on the stator board 125. This would allow, for example, illumination of LA1 while one or more of the LEDs LA2–LA4 are not illuminated. This approach facilitates further precision in controlling the rotor coil shorting in the motor 110 for torque control, speed control, or other desired control strategies using position and/or speed feedback from the encoder 300 and the reference marker detectors 126. One example of the flexibility of this implementation is illustrated in FIGS. 7A–7D, in which the rotor 117 is positioned in FIG. 7A with the reference coil (marked with a circled "X" in the figures) located just past the hard neutral at about 46°. In this situation, the control component 304 could provide the appropriate LED signals to illuminate LA1 and LD4 to ensure that an optical control signal is received by the first detector PD1, while maintaining all the other LEDs off to ensure that the other detectors PD2–PD4 are not activated (and the corresponding rotor coils RC2–RC4 are not shorted). This embodiment thus employs timing control along with selective actuation of individual signaling devices 124 to avoid the possibility of inadvertent actuation of two detectors in the situation shown in FIG. 6A above (e.g., PD1 activated by LA1 while PD4 activated by LA3).

In FIG. 7A, the LEDs LA1 and LD4 are concurrently activated for the time in which the detector PD1 of the selected first coil RC1 is close to both the lighted LEDs LA1 and LD4. As the rotation continues in FIG. 7B, LD4 could be turned off after a time (while maintaining LA1 on) until the detector PD1 is near the end of the range of LA1 at a reference angle of about 65°, at which time LB1 could be illuminated. This form of control with one or two LEDs being used at a time can be used to control a single rotor coil (e.g., RC1) at any position, wherein FIG. 7C shows another exemplary rotor position with LD1 and LA2 being concurrently illuminated to ensure control signal reception by PD2 (reference angle of about 68°), and FIG. 7D illustrates another example at a reference angle of about 72° where only LA2 is illuminated to signal detector PD2. It will be appreciated that the distribution of the LED signaling devices 124 around all (or substantially all) of the stator circumference facilitates precise rotor shorting control, wherein timing controlled activation of one or more individual LEDs may advantageously avoid or largely mitigate imperfections or variances in optical components, manufacturing tolerances, etc.

Figure 9:
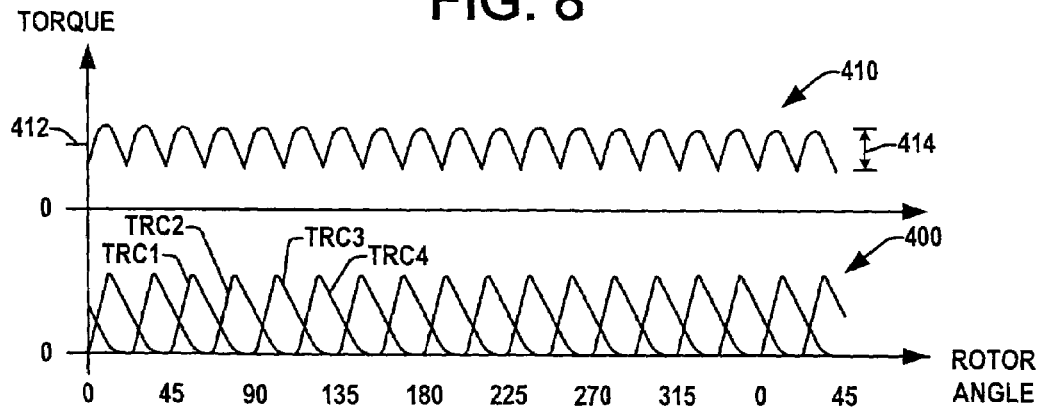
FIG. 9 illustrates a plot of torque vs. rotor angle in the BLR motor of FIGS. 2A–8, including torque ripple for the symmetrical four pole stator thereof.

Referring now to FIGS. 8–16, another aspect of the invention involves the use of stator pole asymmetry to reduce ripple torque in brushless repulsion motors, where stator asymmetry and distributed signaling source features may be employed together in a given BLR motor or may be separately implemented. FIG. 8 illustrates the exemplary BLR motor 110 described above, in which the four stator poles 112 are substantially identical in shape, size, material, and angular extent. FIG. 9 shows a torque vs. rotor angle plot 400 illustrating the rotor torque contributions of the four rotor coils RC1, RC2, RC3, and RC4, (indicated in FIG. 9 as TRC1, TRC2, TRC3, and TRC4, respectively) where the torque curves TRC for the individual coils RC are offset from one another by the rotor coil spacing angle $\theta_{CS}$ (in this case 22.5° as shown in FIG. 2A above). Also shown is a composite torque curve 410 illustrating the total resulting rotor torque. It is noted that the effects of the sinusoidal variation in the stator flux are not shown in the torque curves of FIG. 9 and those of FIGS. 11A and 11B for the sake of illustrating the ripple effects of the rotor coil interaction with the stator poles. The actual torque waveform is the result of the interaction of the current in the armature coils and the flux produced by the stator field wherein the absolute value of the flux produced by the stator field has a sinusoidal waveform that has twice the frequency of the applied stator voltage frequency. In this regard, the torque produced by the armature has a dominant ripple value that varies in a sinusoidal manner from a peak value to a zero value with a 2f rate where f is the frequency of the applied stator voltage. Thus, the actual torque waveforms will be the product of a 2f sinusoid and the idealized torque production as shown in FIGS. 9 and 11B. Due to the stator pole symmetry in the motor 110 (FIG. 8), the segments of a shorted rotor coil RC encounter the stator pole faces in the same manner and at the same time as the rotor 117 rotates in a given direction. As shown in the plot 400 of FIG. 9, each rotor coil RC produces a coil torque component when shorted, which is the sum of the torques produced by the individual torque producing segments thereof (4 coil segments per coil in this case), and the total rotor torque 410 is the sum of the four coil torque components TRC1, TRC2, TRC3, and TRC4 at any given time.

In the illustrated case of FIG. 9, for purposes of illustration, the rotor coils RC are selectively shorted only in the positive torque sectors of the stator field, wherein no negative torque is produced by any of the coils RC. Also, the coils RC are shorted for substantially all of the 45° angular extent of the positive torque sectors (e.g., LEDs LA and LB illuminated continuously. In other cases where the coils RC are shorted for less than the 45° length of the positive torque sectors, the coil torque component curves would be truncated, and would not extend for the full 45°. Each of the rotor coil, torque component curves, moreover, includes a positive torque peak occurring at some angle following the point where the coil segments pass the hard neutral between adjacent rotor pole tips. In particular, the peak torque point corresponds to the mechanical angle at which the rotor coil segments are substantially aligned with the stator pole tips, which corresponds to the point at which the maximum rate of change of reluctance occurs as a function of position. In this regard, the maximum torque production point (peak) will change if the pole tip location is moved on all the stator poles 112. For example, making the stator poles narrower (such that the angular pole face length is reduced) will extend the peak torque point out to an angle farther from that of the hard neutral. Furthermore, with respect to total motor torque, it is noted that the peak torque point of each rotor coil torque component curve occurs before the next coil segment begins generating torque. As a result, the composite torque curve 410 includes an average torque component 412 and a ripple torque component 414 that is significant compared to the average value 412. This ripple torque 414 contributes to noise generation, vibration, rotor bearing wear, and is generally undesirable in a BLR motor 110.

Figure 10:
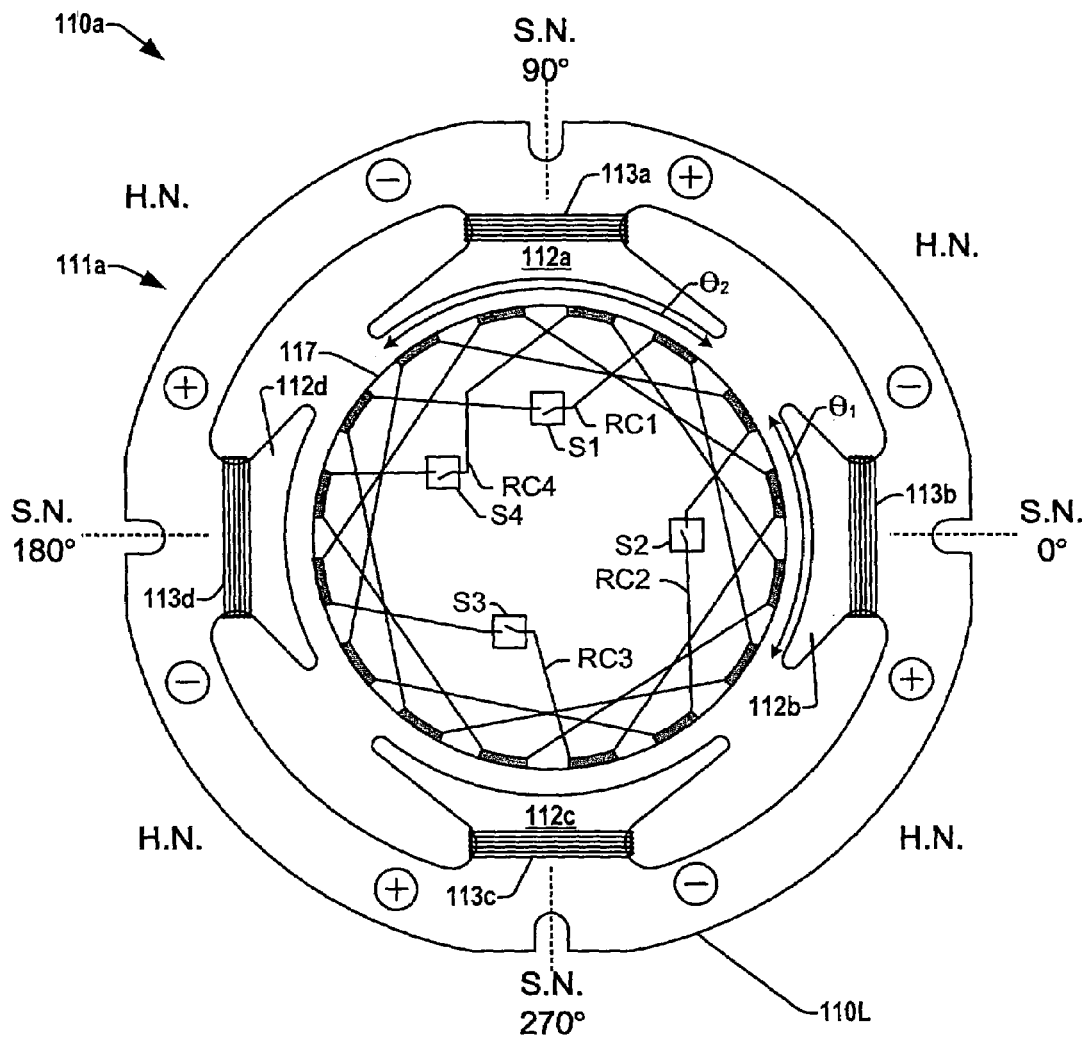
FIG. 10 is a simplified partial end elevation view of another BLR motor having an asymmetrical four pole stator for torque ripple reduction in accordance with another aspect of the invention.
Figure 11A:
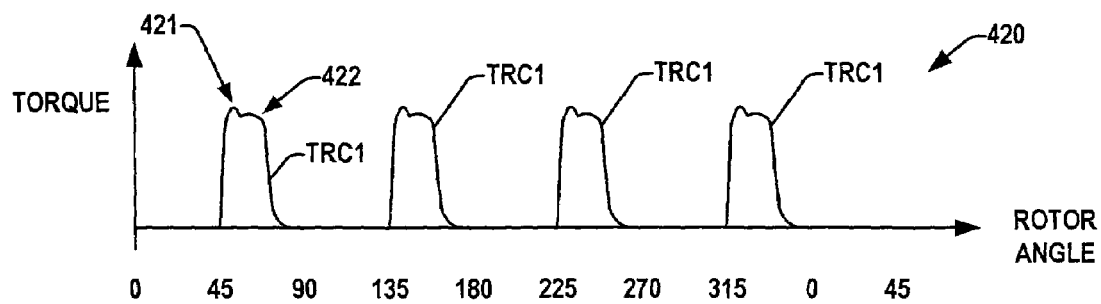
FIG. 11A illustrates a plot of torque vs. rotor angle for a single rotor coil in the BLR motor of FIG. 10, in which the torque peak is angularly spread out by operation of the asymmetrical stator.
Figure 11B:
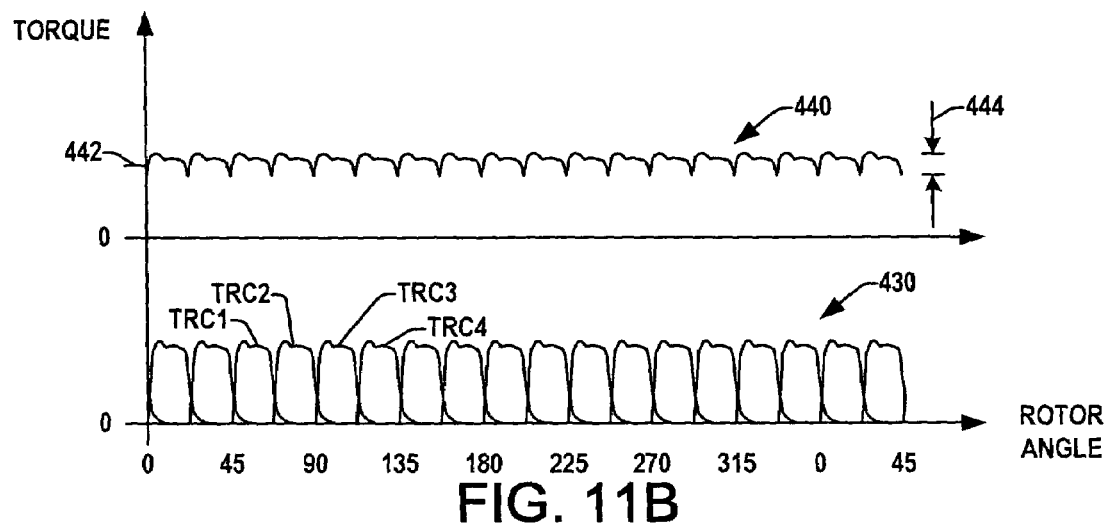
FIG. 11B illustrates a plot of torque vs. rotor angle showing significant torque ripple reduction for the asymmetrical stator pole motor of FIG. 10 compared to the symmetrical pole stator motor of FIGS. 2A–9.
Figure 12A:
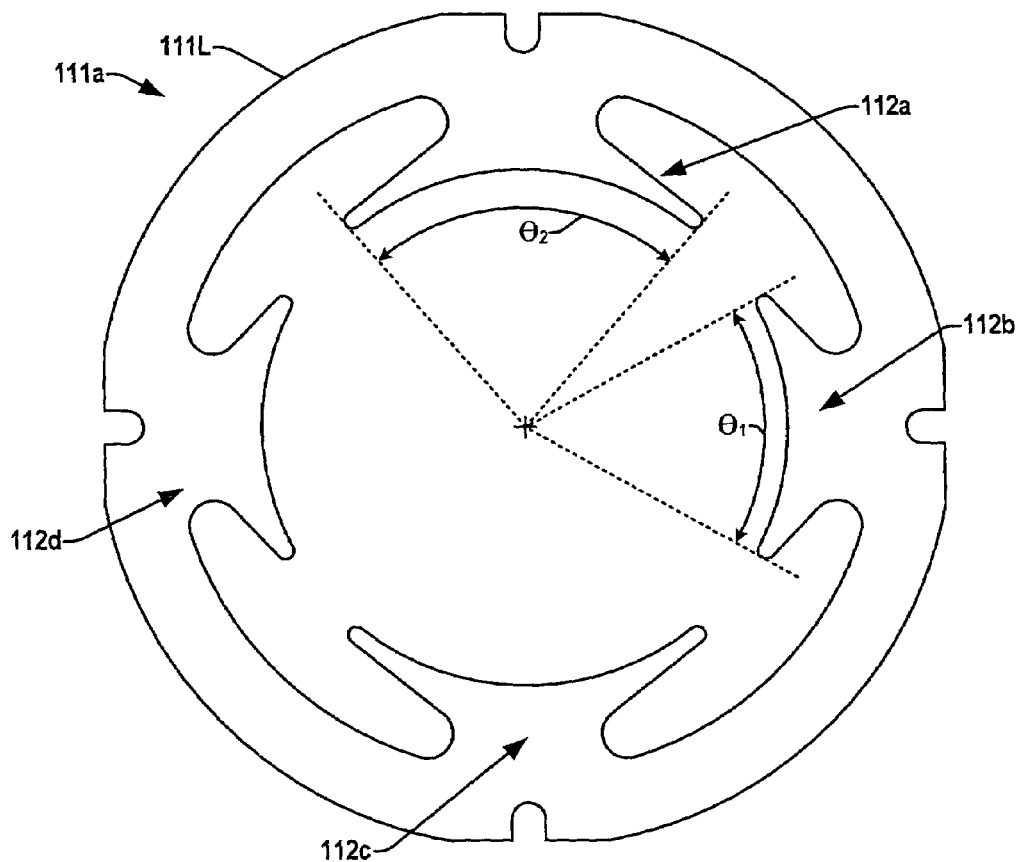
FIGS. 12A and 12B are end elevation and perspective views, respectively, illustrating an exemplary stator laminate or section in the asymmetric stator pole BLR motor of FIG. 10.
Figure 12B:
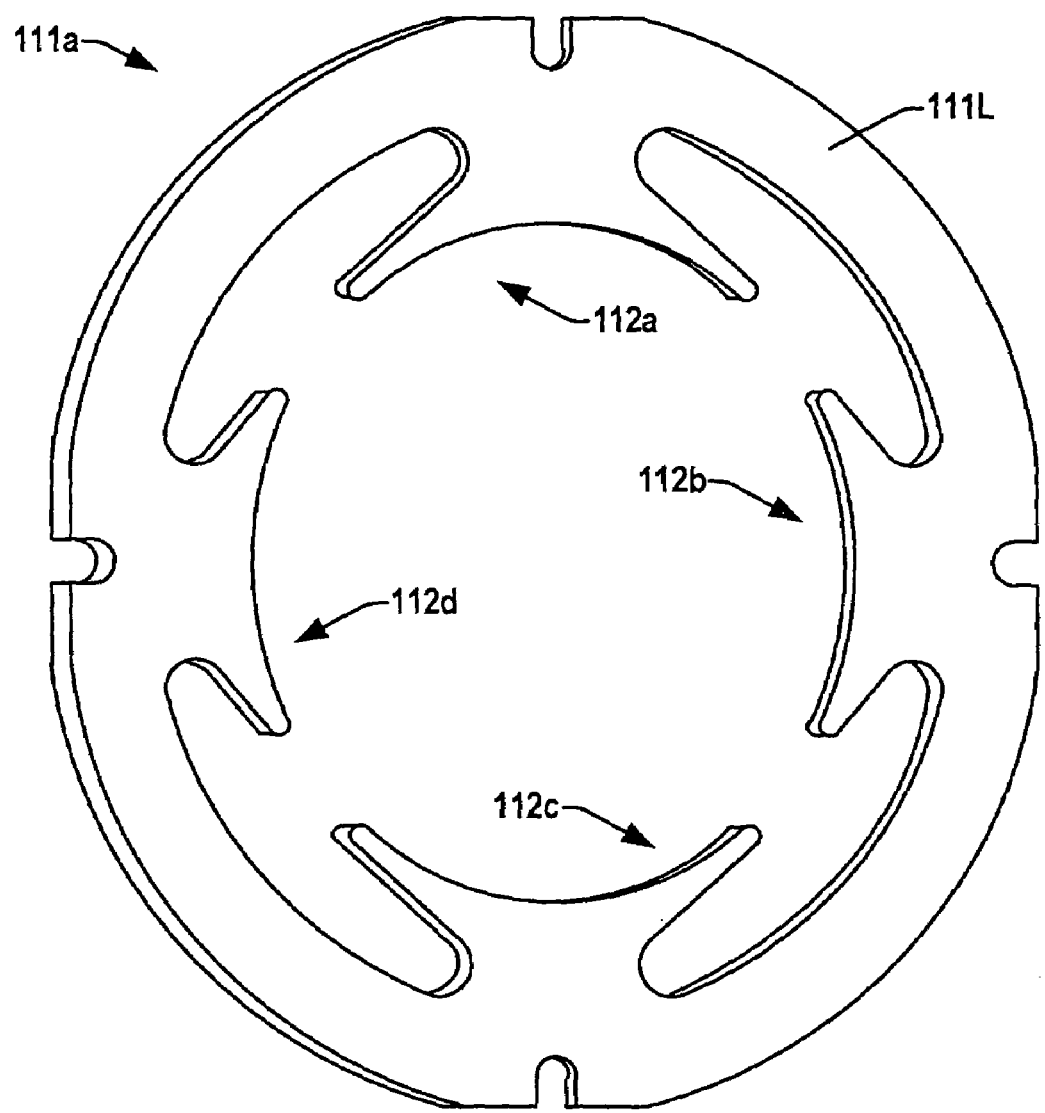
Figure 13:
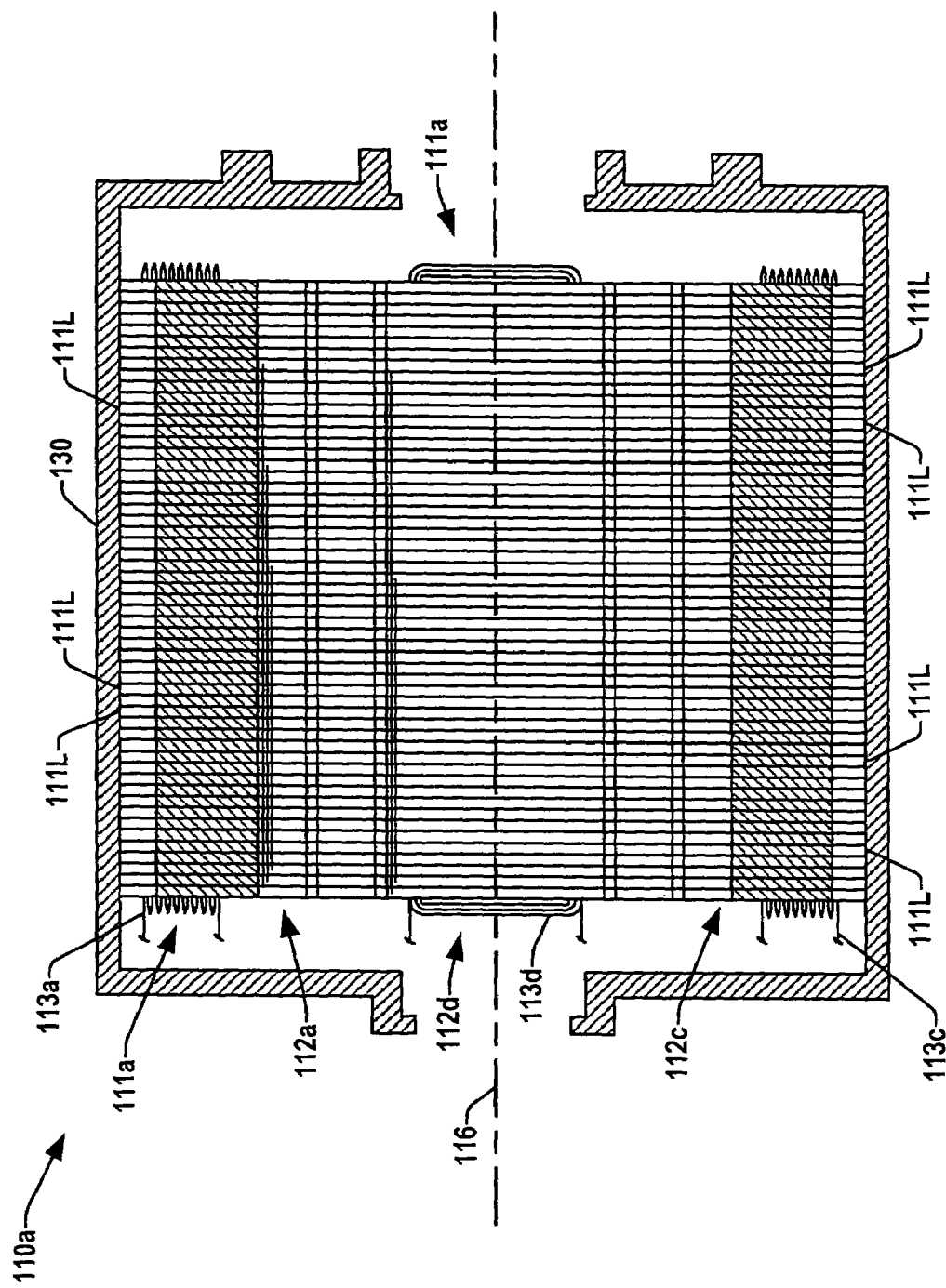
FIG. 13 is a partial side elevation view in section illustrating the exemplary BLR motor of FIG. 10 with the stator being creating using a stack of the stator laminate sections of FIGS. 12A and 12B.

Referring also to FIGS. 10–11B, in order to combat ripple torque in BLR motors, another feature of the present invention provides for asymmetrical stator poles 112, where at least two of the stator poles 112 are different. FIG. 10 shows an exemplary BLR motor 110a with an asymmetrical stator 111a in accordance with this aspect of the invention, where the poles 112b and 112d at 0° and 180°, respectively, extend along a first angular length $\theta_1$, whereas the other stator poles 112a (90°) and 112c (270°) extend along a second angular length $\theta_2$, with $\theta_2$ being greater than $\theta_1$. FIG. 11A illustrates a plot 420 showing torque vs. rotor angle for a single rotor coil RC1 (indicated as TRC1). As shown in the plot 420, the rotor coil torque component curve includes two relative maxima or peaks 421 and 422, respectively, wherein the asymmetry of the stator poles 112 effectively makes the peak of each electrical cycle wider. FIG. 11B provides a plot 440 showing the rotor torque contributions of the four rotor coils RC1, RC2, RC3, and RC4, (indicated as TRC1, TRC2, TRC3, and TRC4, respectively) where the torque curves TRC for the individual coils RC are again offset by 22.5°, and the total composite motor torque is shown in a plot 440 with an average torque value 442 and a ripple torque 444. Comparing the composite torque curve 440 with the curve 410 of FIG. 9 above, it will be appreciated that the use of asymmetric stator poles in the motor 110a of FIG. 10 provides significant reduction in the amount of torque ripple.

Turning also to FIGS. 12A–14C, the asymmetric stator 111a can be constructed using a number of stator laminations or sections 111L (FIGS. 12A and 12B) arranged in a stack (FIG. 13) to form the stator poles 112 with the stator field winding 113 being would around the pole portions 112a–112d of the stacked laminations 111L. In this embodiment, the sections 111L are axially aligned with like pole sections adjacent one another to form stator poles 112a and 112c of angle $\theta_2$ and poles 112b and 112d of angle $\theta_1$, although other implementations may have adjacent stator laminations 111L staggered. FIG. 14A shows the exemplary motor 110a with the rotor at a first position at which a reference coil section of RC1 positioned at a mechanical angle of about 45° during counterclockwise rotation of the rotor 117, where the reference coil is indicated with a circled "X" in the figures for purposes of illustration. At this position in FIG. 14A, the reference coil has just past the hard neutral, and has not yet come into minimum proximity with the closest pole tip 112a1 of the long stator pole 112a. At some point, it is assumed that the rotor coil RC1 is shorted by the signaling system and an associated detector as described above, and it is noted that the hard neutral does not occur exactly at the mechanical 45° angle in this motor 110a due to the asymmetry of the stator poles 112.

Figure 14A:
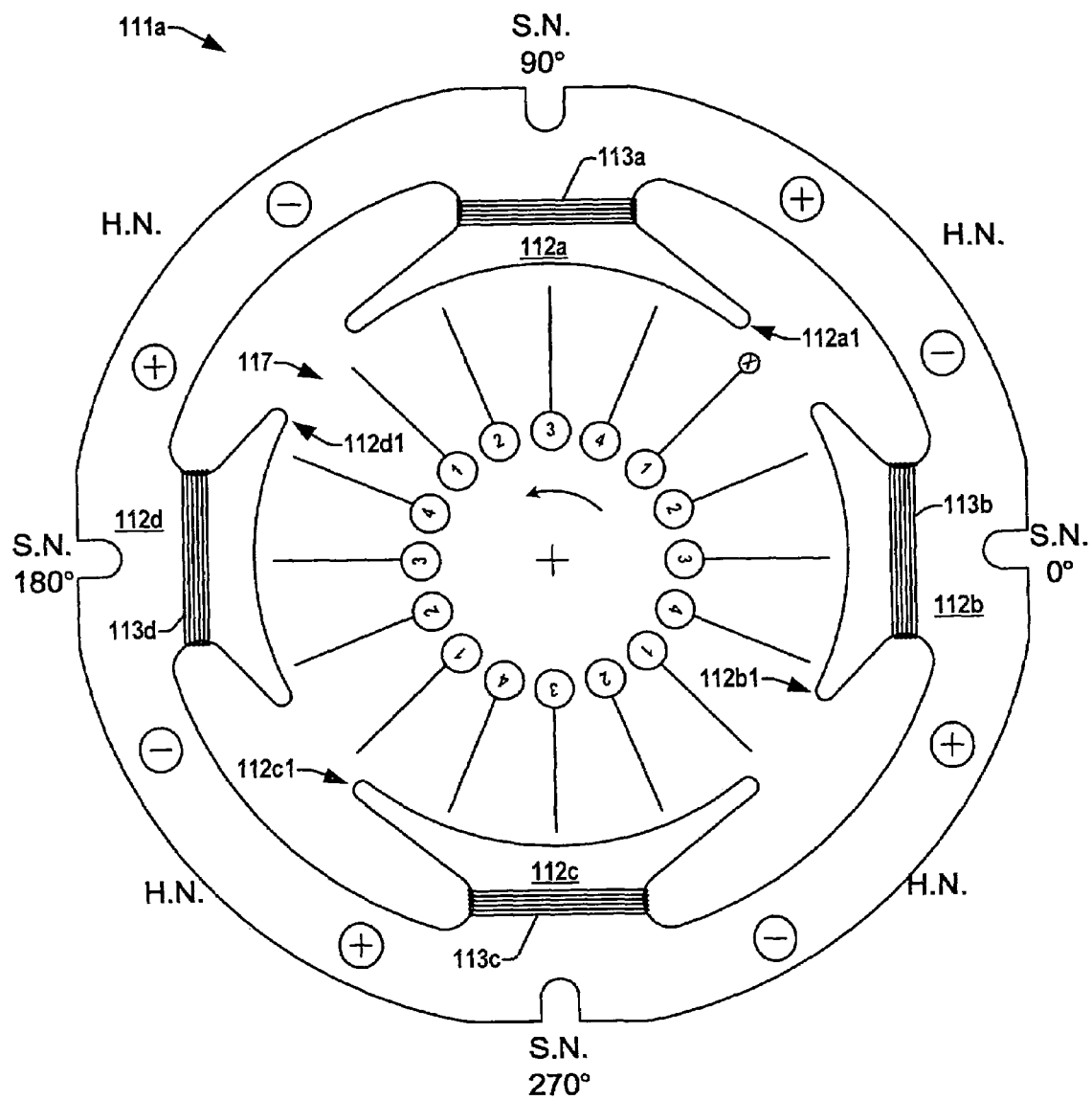
FIGS. 14A–14C are simplified end elevation views schematically illustrating the rotor at three exemplary angles in the asymmetrical stator BLR motor of FIG. 10, in which the rotor coil segments of a first rotor coil encounter stator pole tips at different angles.
Figure 14B:
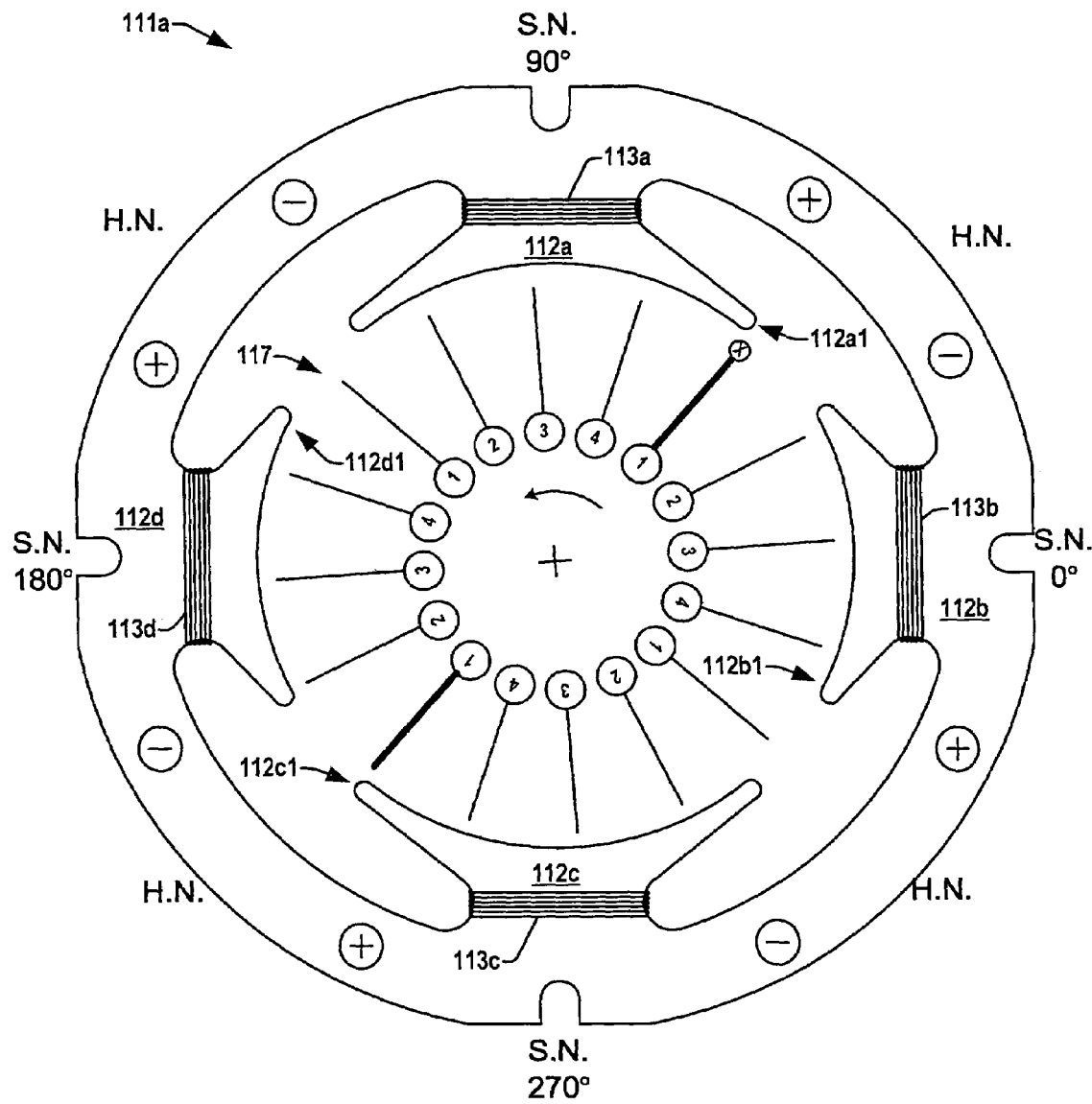
Figure 14C:
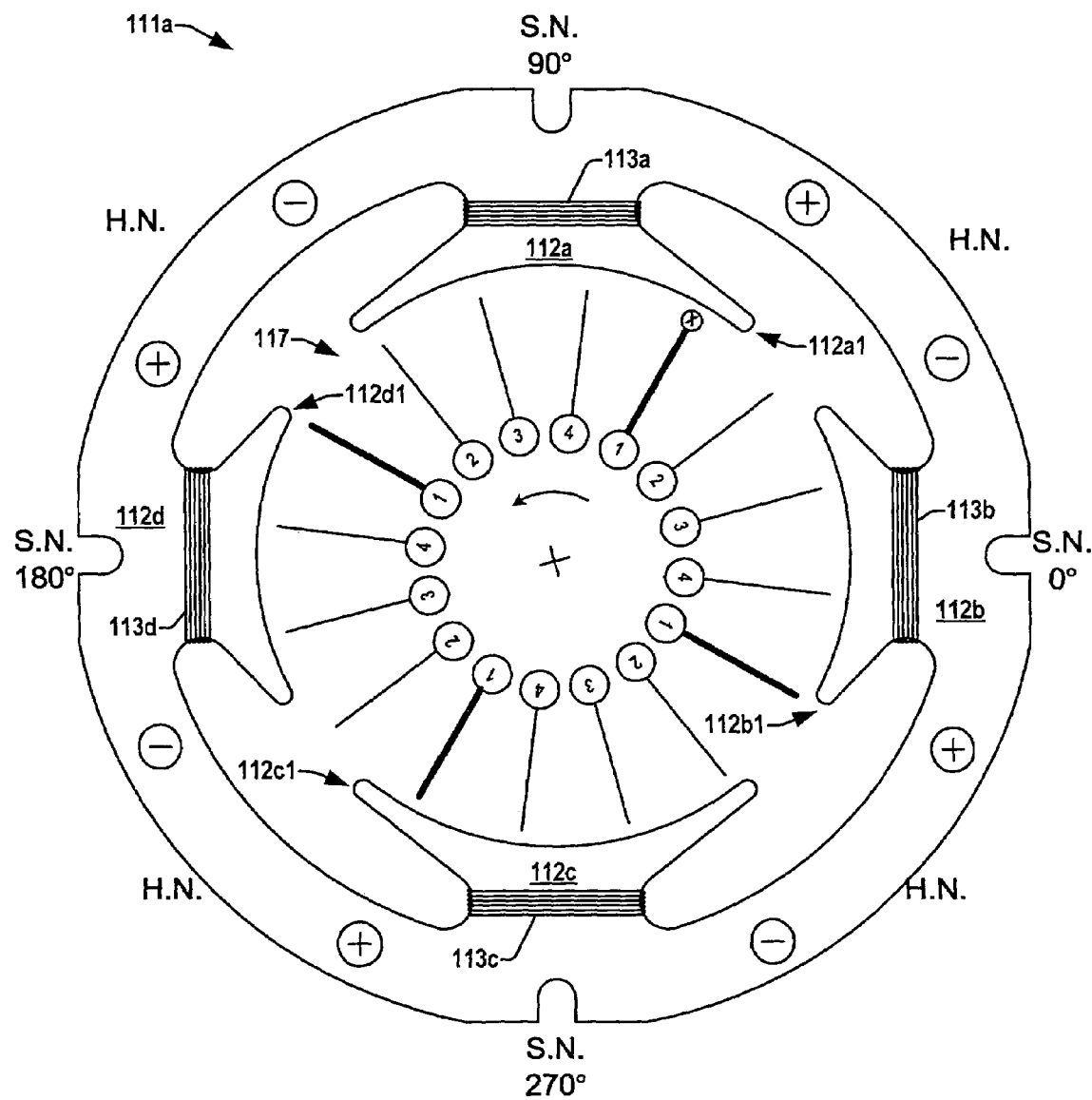

FIG. 14B shows another exemplary rotor position a short time later, whereat the reference coil first encounters the first pole tip 112a1 of stator pole 112a, corresponding to the first peak 421 in the associated coil torque curve 420 in FIG. 11A. At this same position, moreover, the diametrically opposite segment of RC1 encounters the pole tip 112c1 of the lower (long) pole 112c. However, due to the smaller angular length of the lateral poles 112b and 112d, the other rotor coil segments of RC1 have not yet encountered the pole tips 112b1 and 112d1 thereof in the rotor position of FIG. 14B. Turning now to FIG. 14C, as the rotor 117 continues counterclockwise rotation, these coil segments now encounter the lateral pole tips 112b1 and 112d1 at an angle corresponding to the second torque curve peak 422 in FIG. 11A. In this manner, the asymmetric configuration of the stator poles 112 can be used to effectively spread out the coil segment peaks, whereby the overall ripple torque 444 of the composite torque curve 440 (FIG. 11B) is reduced in the motor 110a compared with symmetric pole implementations of a BLR motor.

Figure 15A:
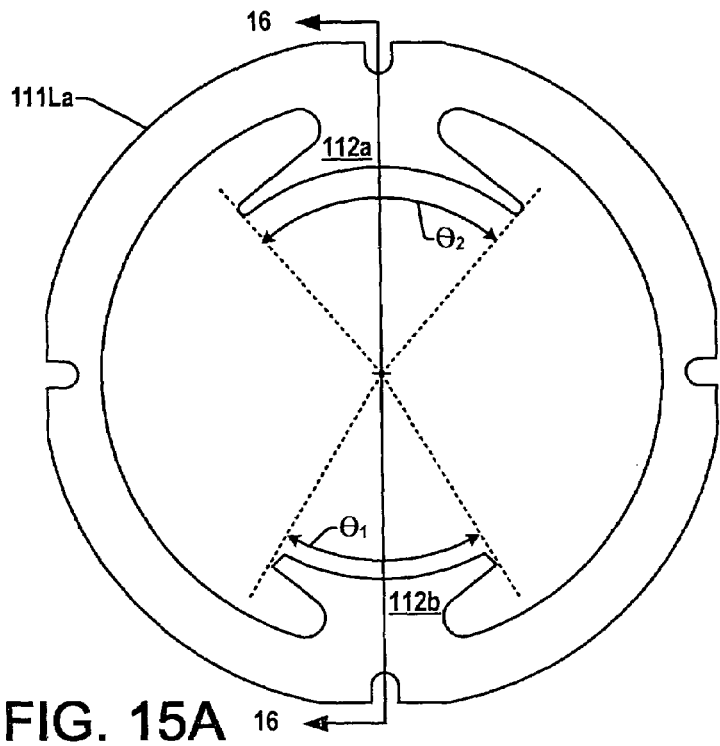
FIGS. 15A and 15B are end elevation views showing first and second two-pole stator laminations, respectively, each having two different pole sections of different first and second angular lengths, where the upper pole section is the shorter section in FIG. 15A and where the low section is the shorter pole section in FIG. 15B.
Figure 15B:
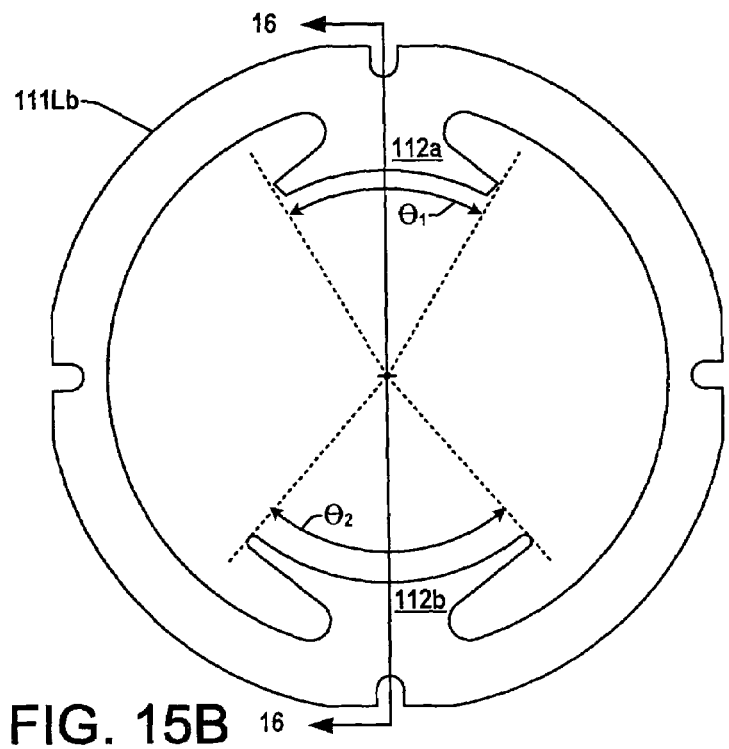
Figure 16:
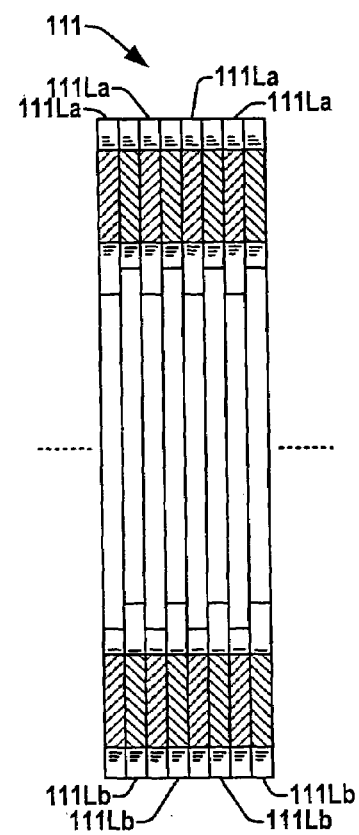
FIG. 16 is a partial sectional side elevation view in section taken along lines 16—16 in FIGS. 15A and 15B showing adjacent stator laminations staggered with respect to one another.

Another embodiment of an asymmetric stator pole configuration for a two pole BLR motor is shown in FIGS. 15A–16, in which a generally symmetric two pole lamination 111L is made asymmetric by removal of portions of the pole tips for one of two pole sections, with the laminations 111L being staggered in constructing the stator stack. In FIG. 15A, a first asymmetric lamination 111La is shown with an upper (long) pole portion 112a extending along an angular pole face length $\theta_2$, and a lower pole portion 112b of a shorter angular length $\theta_1$. FIG. 15B shows a second lamination 111Lb, effectively rotated 180° relative to that of FIG. 14A, wherein the upper pole portion 112a is of a shorter angular length $\theta_1$ than the lower pole portion 112b ($\theta_2$). FIG. 16 shows a portion of a stator stack created by staggered positioning of alternating laminations 111L, where the laminations 112La and 112Lb are positioned in alternating fashion. In this arrangement, the longer upper pole portions 112a of the laminations 111La are positioned next to the shorter upper pole portions 112a of the second laminations 111Lb, and the shorter lower pole portions 112b of the first laminations 111La are positioned next to the longer lower portions 112b of the second laminations 111Lb. In this manner, the rotor coil torque peak is again spread out through a wider angle than in the case of a symmetric pole stator, by which the overall torque ripple is decreased for a BLR motor. Furthermore, the inventors have appreciated that the staggered stacking technique shown in FIGS. 15A–16 allows ripple torque reduction without creating unbalanced forces on the rotor 117 of a BLR motor.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

Having thus described the invention, the following is claimed:

1. A brushless repulsion motor comprising:
    a stator having an integer number Ns stator poles and at least one field winding producing a stator field having 2Ns torque sectors of alternating first and second opposite torque polarities, Ns being a positive integer greater than 1;

a signaling system mounted in a fixed position relative to the stator and including one or more signaling devices individually adapted to selectively provide a control signal;

a rotor rotatably mounted relative to the stator for rotation about an axis between the stator poles, the rotor comprising Nrc rotor coil circuits, Nrc being a positive integer greater than 0, the rotor coil circuits individually comprising:

a rotor coil comprising Nrcs rotor coil segments adapted to electromagnetically interact with the stator field, Nrcs being a positive integer greater than 1, an electronic switch circuit comprising at least one electronic switch to selectively short the rotor coil in response to a switch signal, the stator field operating to induce current in the rotor coil when the rotor coil is shorted to produce a resultant relative torque and rotation between the rotor and the stator, and a detector located on the rotor to rotate past the signaling system in a circular path about the axis and to selectively receive the control signal when the rotor coil is in a predetermined angular position relative to the stator poles, the detector providing the switch signal to the electronic switch circuit to short the rotor coil when the control signal is received;

wherein each detector is angularly spaced from a closest neighboring detector by a detector angle that is greater than 360°/(Nrc*Nrcs).

2. The brushless repulsion motor of claim 1, wherein the individual torque sectors of the stator field have an angular length of about 360°/2Ns.

3. The brushless repulsion motor of claim 1, wherein the signaling system comprises a first set of Ns signal groups associated with torque sectors of the first torque polarity, the signal groups individually having one or more signaling devices individually adapted to selectively provide a control signal, and a second set of Ns signal groups associated with torque sectors of the second torque polarity.

4. The brushless repulsion motor of claim 1, wherein the detector of each individual rotor coil circuit is angularly spaced from at least one rotor coil segment of the corresponding rotor coil by a coil segment detector angle of about K*360°/Ns plus an offset angle, K being a positive integer greater than 0.

5. The brushless repulsion motor of claim 4, wherein the detector angle is about 360°/(Nrc*Nrcs) plus 360°/2Ns.

6. The brushless repulsion motor of claim 5, wherein the individual torque sectors of the stator field have an angular length of about 360°/2Ns.

7. The brushless repulsion motor of claim 4, wherein the individual torque sectors of the stator field have an angular length of about 360°/2Ns.

8. The brushless repulsion motor of claim 1, wherein the signaling devices are distributed around substantially the entire circumference of the stator.

9. The brushless repulsion motor of claim 8, wherein the individual torque sectors of the stator field have an angular length of about 360°/2Ns.

10. The brushless repulsion motor of claim 1, wherein the detector angle is about 360°/(Nrc*Nrcs) plus 360°/2Ns.

11. A brushless repulsion motor comprising:

a stator comprising first and second stator poles extending along different first and second angular lengths and at least one field winding producing a stator field;

a signaling system mounted in a fixed position relative to the stator and comprising one or more signaling devices individually adapted to selectively provide a control signal;

a rotor rotatably mounted relative to the stator for rotation about an axis between the stator poles, the rotor comprising a plurality of rotor coil circuits, the rotor coil circuits individually comprising: a rotor coil adapted to electromagnetically interact with the stator field, an electronic switch circuit comprising at least one electronic switch to selectively short the rotor coil in response to a switch signal, the stator field operating to induce current in the rotor coil when the rotor coil is shorted to produce a resultant relative torque and rotation between the rotor and the stator, and a detector located on the rotor to rotate past the signaling system in a circular path about the axis and to selectively receive the control signal when the rotor coil is in a predetermined angular position relative to the stator poles, the detector providing the switch signal to the electronic switch circuit to short the rotor coil when the control signal is received.

12. The brushless repulsion motor of claim 11, wherein the stator comprises a plurality of stator sections arranged in a stack to form the first and second stator poles.

13. The brushless repulsion motor of claim 12, wherein the stator sections are angularly aligned with one another in the stack to form the first and second stator poles.

14. The brushless repulsion motor of claim 12, wherein the stator sections individually comprise first and second pole portions extending along different angular lengths.

15. The brushless repulsion motor of claim 11, wherein the first and second stator poles have first and second pole faces, respectively, the first and second pole faces being radially spaced from the axis by generally equal radial distances.

16. The brushless repulsion motor of claim 11, wherein the first and second angular lengths are calculated to minimize variations in torque impulses by splitting rotor torque pulse peaks associated with individual rotor coils into smaller generally equal peaks.

17. A brushless repulsion motor comprising:

a stator comprising a plurality of stator poles and at least one field winding producing a stator field, the stator comprising:

a first stator pole pair comprising a first stator pole and a second stator pole, the first and second stator poles being substantially identical to one another and being angularly offset by about 180° from one another; and a second stator pole pair comprising a third stator pole and a fourth stator pole, the third and fourth stator poles being substantially identical to one another and being angularly offset by about 180° from one another, wherein at least two of the first, second, third, and fourth stator poles are different;

a signaling system mounted in a fixed position relative to the stator and comprising one or more signaling devices individually adapted to selectively provide a control signal;

a rotor rotatably mounted relative to the stator for rotation about an axis between the stator poles, the rotor comprising a plurality of rotor coil circuits, the rotor coil circuits individually comprising: a rotor coil adapted to electromagnetically interact with the stator field, an electronic switch circuit comprising at least one electronic switch to selectively short the rotor coil in response to a switch signal, the stator field operating to induce current in the rotor coil when the rotor coil is shorted to produce a resultant relative torque and rotation between the rotor and the stator, and a detector located on the rotor to rotate past the signaling system in a circular path about the axis and to selectively receive the control signal when the rotor coil is in a predetermined angular position relative to the stator poles, the detector providing the switch signal to the electronic switch circuit to short the rotor coil when the control signal is received.

18. The brushless repulsion motor of claim 17, wherein the stator comprises first and second stator poles extending along different first and second angular lengths.

19. The brushless repulsion motor of claim 18, wherein the first and second angular lengths are calculated to minimize variations in torque impulses by splitting rotor torque pulse peaks associated with individual rotor coils into smaller generally equal peaks.

20. The brushless repulsion motor of claim 17, wherein the stator comprises a plurality of stator sections arranged in a stack to form the first and second stator pole pairs.

21. A brushless repulsion motor comprising:

a stator having a plurality of stator sections arranged in a stack to form a plurality of stator poles, the stator sections individually having first and second pole portions extending along different first and second angular lengths, respectively, with the stator sections being angularly aligned with one another in the stack to form first and second stator poles extending along the first and second angular lengths, respectively, and at least one field winding wound around the pole portions of the stack to produce a stator field;

a signaling system mounted in a fixed position relative to the stator and comprising one or more signaling devices individually adapted to selectively provide a control signal;

a rotor rotatably mounted relative to the stator for rotation about an axis between the stator poles, the rotor comprising a plurality of rotor coil circuits, the rotor coil circuits individually comprising: a rotor coil adapted to electromagnetically interact with the stator field, an electronic switch circuit comprising at least one electronic switch to selectively short the rotor coil in response to a switch signal, the stator field operating to induce current in the rotor coil when the rotor coil is shorted to produce a resultant relative torque and rotation between the rotor and the stator, and a detector located on the rotor to rotate past the signaling system in a circular path about the axis and to selectively receive the control signal when the rotor coil is in a predetermined angular position relative to the stator poles, the detector providing the switch signal to the electronic switch circuit to short the rotor coil when the control signal is received.

22. The brushless repulsion motor of claim 21, wherein the first and second stator poles have first and second pole faces, respectively, the first and second pole faces being radially spaced from the axis by generally equal radial distances.

23. The brushless repulsion motor of claim 21, wherein the first and second angular lengths are calculated to minimize variations in torque impulses by splitting rotor torque pulse peaks associated with individual rotor coils into smaller generally equal peaks.

* * * * *